United States Patent [19]

Rinde et al.

[11] Patent Number: 5,104,930
[45] Date of Patent: Apr. 14, 1992

[54] POLYUREA GEL COMPOSITIONS AND ARTICLES THEREFROM

[75] Inventors: James A. Rinde, Fremont; Frank W. Mercer, Belmont, both of Calif.; Keith Dawes, Raleigh, N.C.; Rudolf R. Bukownik, Palo Alto, Calif.

[73] Assignee: Raychem Corporation, Menlo Park, Calif.

[21] Appl. No.: 660,770

[22] Filed: Feb. 25, 1991

Related U.S. Application Data

[63] Continuation-in-part of Ser. No. 485,686, Feb. 27, 1990, abandoned.

[51] Int. Cl.$^5$ .............................................. C08L 75/02
[52] U.S. Cl. ................................... 524/871; 524/874; 524/710; 524/723; 524/730; 524/775; 528/28; 528/45; 528/59; 528/61; 528/64; 528/65; 528/66; 528/75; 528/76; 528/80; 528/83
[58] Field of Search ............... 524/871, 874, 710, 723, 524/730, 775; 528/28, 45, 59, 61, 64, 65, 66, 75, 76, 80, 83; 427/385.5

[56] References Cited

U.S. PATENT DOCUMENTS

| | | | |
|---|---|---|---|
| 3,892,696 | 7/1975 | Wood | 260/29.2 TN |
| 4,600,261 | 7/1986 | Debbaut | 339/116 C |
| 4,634,207 | 1/1987 | Debbaut | 339/116 C |
| 4,716,183 | 12/1987 | Gamarra et al. | 522/80 |
| 4,777,063 | 10/1988 | Dubrow et al. | 427/44 |
| 4,794,129 | 12/1988 | Gillis, Jr. et al. | 521/121 |
| 4,798,862 | 1/1989 | Gillis, Jr. | 524/783 |
| 4,942,270 | 7/1990 | Gamarra | 174/93 |

FOREIGN PATENT DOCUMENTS

| | | |
|---|---|---|
| 0174165A1 | 3/1986 | European Pat. Off. . |
| 1570361 | 2/1970 | Fed. Rep. of Germany . |
| 1595748 | 5/1970 | Fed. Rep. of Germany . |
| WO86/06561 | 11/1986 | PCT Int'l Appl. . |
| WO90/10035 | 9/1990 | PCT Int'l Appl. . |

OTHER PUBLICATIONS

Texaco Chemical Company brochure entitle "Polyurea Spray Technology Information", (1989).
Texaco Chemical Company brochure entitled "Technical Bulletin—Polyurea Spray Technology of Formulators", (1988).

Primary Examiner—Maurice J. Welsh
Attorney, Agent, or Firm—Yuan Chao; Herb Burkard

[57] ABSTRACT

Crosslinkable gel compositions cure rapidly to provide gel compositions which possess superior combinations of chemical and physical properties and aging resistance. These compositions are particularly useful for environmentally protecting substrates, especially electrical conductors, connectors, and splices and for sealing around jacketed cables, for example where they enter splice cases.

40 Claims, 9 Drawing Sheets

FIG_3

POLYUREA GEL COMPOSITIONS AND ARTICLES THEREFROM

CROSS-REFERENCE TO RELATED APPLICATIONS

This application is a continuation-in-part of application Ser. No. 07/485,686, filed Feb. 27, 1990 and now abandoned, the disclosure of which is incorporated herein by reference.

FIELD OF THE INVENTION

This invention relates to cured gels and curable compositions for providing gels.

BACKGROUND OF THE INVENTION

Cured gels including polyurethane gels have long been used to seal electrical components and to protect metallic structures from corrosion, for example, by sea-water. For example, polyurethane gels have been cast in place around multiconductor cable joints by mixing the gel forming components (di- or polyisocyanates and hydroxy-terminated polybutadienes or polyesters) and a diluent and then pouring the mixture quickly around the joint and allowing it to cure in place. The curing of polyisocyanate/diol mixtures is relatively slow (for example, several days even with catalyst added) at room temperature. In recent years, as disclosed inter alia in U.S. Pat. Nos. 4,600,261 and 4,634,207 (Debbaut), the disclosures of which are incorporated herein by reference for all purposes, articles comprising precured gels have been used to protect electrical contacts and other substrates.

Other known uses for gels include the insulation of busbars and other electrical components using silicone gels and non-silicone gels, especially butyl gels as described by Chang and Toy in EP 0174165 (1986) and by Toy in EP 0229102 (1987), which describes, inter alia, the use of such gels as insulating and stress grading compositions in high voltage terminations and connectors. The disclosure of each of these applications is incorporated herein by reference.

The polyurethane gels used by the prior art have excellent short term physical properties but have poor aging resistance, i.e. they are poor in such long term chemical and physical properties as hydrolytic and thermal stability, resistance to moisture and resistance to compression set especially at higher temperatures within the anticipated service range. In addition, polyurethane gels can under certain circumstances extract plasticizer from, or otherwise impair the functionality of, poly(vinyl chloride) insulation.

SUMMARY OF THE INVENTION

We have discovered novel gel compositions which are useful for sealing and environmentally protecting substrates, especially electrical connections. The novel compositions exhibit unexpectedly superior and useful combinations of tensile strength, elongation, toughness and compatibility with substrates including those comprising poly(vinyl chloride), accepting high levels of diluent without significant syneresis, while maintaining beneficial tack properties which are valuable for gel sealant compositions.

In one aspect this invention provides a composition comprising a crosslinked polyurea. The crosslinked polyurea is preferably present as a gel. The composition and, preferably, also the polyurea gel, has a Voland hardness of from 1 to 500 g. and an ultimate elongation of at least 50%. Preferably the polyurea gel comprises from at least 25% by weight to 95% by weight of a diluent (based on the combined weights of the polyurea and the diluent). More preferably the polyurea gel comprising from at least 25% by weight to 95% by weight of a diluent has a gel fraction of 5% by weight to 75% by weight of the combined weights of the polyurea and diluent. Preferably, the diluent comprises a liquid which is compatible with (e.g. swells) the crosslinked polyurea and which is preferably unaffected chemically by the conditions used to prepare the crosslinked polyurea.

In another aspect of this invention the average molecular weight between urea groups in the polyurea is less than 500 g per mole of polymer, for example, less than 250 g per mole of polymer. Gels having such densities of urea groups are particularly useful where a high dielectric constant is needed. In some applications, an average molecular weight between urea groups greater than 500 may be preferred, for example, at least 1000 g per mole of polymer, or even at least 2000 g per mole of polymer may be desirable, for instance where a lower dielectric constant gel is needed.

The term "crosslink" in this specification means a covalent bond formed by chemical reaction between two crosslinkable sites from which sites depend a total of three or more molecular segments; or at least two covalent bonds, each formed by chemical reaction between a crosslinkable site and an intermediate molecule, so that the residue of the molecule has at least three molecular segments depending therefrom. Typically the intermediate compound is a low molecular weight compound or a low molecular weight oligomeric material containing at least three crosslinkable sites. A crosslink can be trifunctional (a T-link, i.e. a crosslink having three molecular segments depending therefrom), or tetrafunctional (an H-link, i.e. a crosslink having four molecular segments depending therefrom) or can have yet higher functionality.

In another aspect, this invention provides a crosslinkable composition which when fully cured has a Voland hardness of from 1 to 500 g. and an ultimate elongation of at least 50%, the curable composition comprising a first organic compound containing amine groups, a second organic compound containing isocyanate groups or isocyanate precursor groups and a diluent in an amount from 25% by weight to 95% by weight of the combined weights of the first organic compound, the second organic compound and the diluent. In a preferred embodiment the first organic compound is a polyamine containing an average of n amine groups per molecule and the second organic compound is a polyisocyanate or polyisocyanate precursor containing an average of m isocyanate or isocyanate precursor groups per molecule, where each of n and m are at least 2 and the sum of n and m is at least 4.1, the composition having a gel time (as defined hereunder) in the absence of added catalyst of less than 600 seconds at 25° C.

In another aspect this invention provides a kit comprising at least two containers, each of said containers comprising at least one material selected from the group consisting of:
(1) a first organic compound containing amine groups;
(2) an second organic compound containing isocyanate groups or isocyanate precursor groups; and
(3) a diluent which is inert to reaction with the first organic compound and inert to reaction with the second organic compound, the total amount of the diluent in the containers being from 25% by weight to 95% by weight of the combined weights of the first and second organic compounds and the diluent in the containers;

the division of materials between the containers being such that the first organic compound and the second organic compound are stable when the containers are maintained at room temperature (25° C.) under dry conditions for 6 months;

The contents of the containers when mixed and fully cured providing a crosslinked polyurea gel which has a Voland hardness of from 1 to 500 g. and an ultimate elongation of at least 50%.

Preferably in this aspect of the invention the first organic compound is a polyamine containing an average of n amine groups per molecule and the second organic compound is a polyisocyanate or polyisocyanate precursor containing an average of m isocyanate or isocyanate precursor groups per molecule, where each of n and m are at least 2 and the sum of n and m is at least 4.1.

Another aspect of the invention provides a method of forming a polyurea gel having a Voland hardness of from 1 to 500 g and an ultimate elongation of at least 50% which method comprises reacting together (1) a first organic compound containing amine groups; and (2) a second organic compound containing isocyanate groups or isocyanate precursor groups;

in the presence of a diluent, which is inert to reaction with the first organic compound and inert to reaction with the second organic compound, in an amount of from at least 25% by weight to 95% by weight of the combined weights of the first organic compound, the second organic compound and the diluent. Preferably in this aspect of the invention the first organic compound is a polyamine containing an average of n amine groups per molecule and the second organic compound is a polyisocyanate or polyisocyanate precursor containing an average of m isocyanate or isocyanate precursor groups per molecule, where each of n and m are at least 2 and the sum of n and m is at least 4.1.

In another aspect this invention provides an article, for protecting a substrate, comprising a composition which comprises a polyurea gel and which has a Voland hardness of from 1 to 500 g. and an ultimate elongation of at least 50%. Preferably the article also comprises means for deforming the cured gel into contact with the substrate, more preferably means for deforming the cured gel into close and conforming contact with the substrate.

In another aspect, this invention provides a substrate protectively encapsulated at least in part by a composition which comprises a cured polyurea gel and which has a Voland hardness of from 1 to 500 g. and an ultimate elongation of at least 50%.

In another aspect, this invention provides a method of encapsulating a substrate which comprises surrounding the substrate with a mixture comprising:

(1) a first organic compound containing amine groups;

(2) a second organic compound containing isocyanate groups or isocyanate precursor groups; and (3) a diluent, which is unaffected chemically by the reaction between the first organic compound and the second organic compound, said diluent being present in an amount of from at least 25% by weight to 95% by weight of the combined weights of the first organic compound, the second organic compound and the diluent; and curing the mixture in contact with the substrate. Preferably in this aspect of the invention the first organic compound is a polyamine containing an average of n amine groups per molecule and the second organic compound is a polyisocyanate or polyisocyanate precursor containing an average of m isocyanate or isocyanate precursor groups per molecule, where each of n and m are at least 2 and the sum of n and m is at least 4.1.

A still further aspect of this invention provides a method for protecting a substrate comprising:

(1) providing a cured polyurea gel;

(2) applying said cured polyurea gel to said substrate such that said composition substantially encapsulates at least a portion of said substrate.

Another aspect of this invention provides a method for protecting a substrate comprising:

(1) providing a composition which comprises a crosslinked polyurea, the composition having a Voland hardness of from 1 to 500 g and an ultimate elongation of at least 50%;

(2) applying the composition to the substrate such that the composition substantially surrounds at least a portion of the substrate.

Another aspect of this invention provides a method for preparing a composition of predetermined dielectric constant comprising:

(A) selecting a blend of diluents each of which exhibits a dielectric constant different from any other of the diluents selected, the weight ratios of the diluents being chosen such that the blend has a desired dielectric constant; and (B) incorporating the blend into a composition comprising a first organic compound containing amine groups; a second organic compound containing isocyanate groups or isocyanate precursor groups; and curing the composition to form a crosslinked polyurea gel; the relative proportions and amount of the blend being such that the composition exhibits the predetermined dielectric constant.

In many of these aspects of the invention it is advantageous for the diluent to comprise a mixture of components, at least one of which is a liquid at room temperature and exhibits a dielectric constant that differs from at least one of the other components.

DETAILED DESCRIPTION OF THE INVENTION

Figure 1:
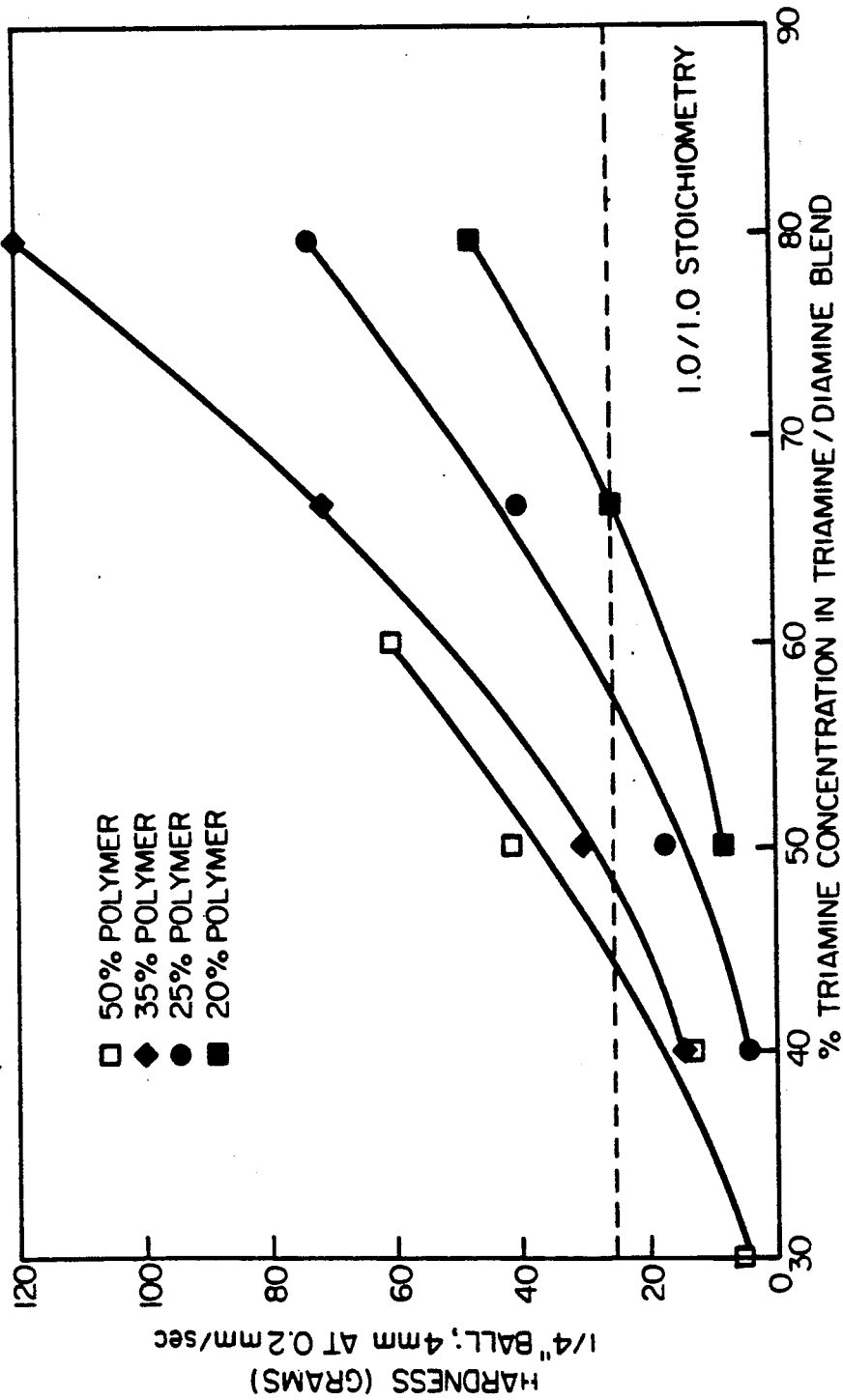
FIG. 1 illustrates how the hardness of cured polyurea gels of the invention varies with the polyurea concentration or the crosslink density (triamine content of the triamine/diamine blend).

In the present invention the average molecular weight between crosslinks ($M_c$) of the cured polyurea gel is preferably at least 2,000, for example at least 4,000, more preferably at least 7,500, for example at least 10,000 and, in some embodiments, at least 20,000. The Voland hardness of the composition is preferably 2 to 375 g, particularly 2 to 125 g, especially 2 to 40 g. The ultimate elongation of the composition is preferably at least 250% and particularly at least 650%, for example, at least 700%, especially at least 800%.

The first (amine containing) compound used in preparing these novel gels can be a single compound or a mixture of compounds, for example, one or more compounds each having at least three amine groups per molecule and/or one or more compounds each having at least two amine groups per molecule. The second (isocyanate- or isocyanate precursor-containing) compound can likewise be a single compound or a mixture of compounds, for example, one or more compounds each having at least three reactive groups per molecule and/or one or more compounds each having at least two reactive groups per molecule. The molar equivalent ratio of the first compound or combination of compounds to the second compound or compounds is preferably such that a majority of the molecules of reactants are joined to one or more other molecules by at least two crosslinks (that is form closed loops which comprise at least part of a three dimensional network). More preferably at least 50%, for example at least 65%, preferably at least 75% of the crosslinks form such closed loops. For this purpose the molar equivalent ratio of the first compound or compounds to the second compound or compounds is preferably from 0.67 to 1 to 1.5 to 1, for example, 0.8 to 1 to 1.25 to 1, more preferably 0.9 to 1 to 1.11 to 1.

The polyurea gel may be pre-cured (that is, cured before being brought into contact with the substrate), or it can be cured after coming into contact with the substrate. If the gel is pre-cured, it is preferably associated with means for deforming the cured polyurea gel into contact with the substrate and/or means for maintaining the cured polyurea gel in contact with the substrate, preferably by compression.

Preferably cured polyurea gels and gel compositions of the present invention have a cohesive strength greater than the adhesive strength of the gel or gel composition.

The compositions of the invention preferably contain at least 25%, for example at least 30%, more preferably at least 45%, for example, at least 60% of a diluent, the percentages being by weight of the combined weights of the crosslinked polyurea and the diluent. Amounts of diluent corresponding to these ranges are preferably used in preparing the gels and/or gel compositions.

Preferably the first organic compound has the formula

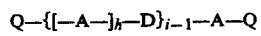

and the second organic compound has the formula:

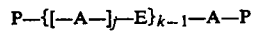

where each of h, j, i and k, which may be the same or different, is an integer having a value of at least 1 such that the sum of h, j, i and k is at least 20 and less than 200;

each of the Q radicals, which may be the same or different is linked directly to a carbon atom of an A radical and is a primary or secondary amine group;

each of the P radicals, which may be the same or different is linked directly to a carbon atom of an A radical and is an isocyanate or isocyanate precursor group;

each of the A radicals, which may be the same or different,

—R—, —R—O—R—, —R—CO$_2$—R—,
—R—NH—CO—R—, —R—NH—CO$_2$—R—,
—R—S—R—, —O—Si(R')$_2$—or
—O—Si(R')$_2$—R— where each of the R radicals, which may be the same or different, is an alkylene, substituted alkylene, alkenylene, substituted alkenylene, arylene or substituted arylene radical, and each of the R' radicals, which may be the same or different is an alkyl, substituted alkyl, aryl or substituted aryl radical;

each of the D radicals, which may be the same or different, is a valence bond or a secondary amine group or an alkylene, substituted alkylene, alkenylene, substituted alkenylene, arylene or substituted arylene radical; and each of the E radicals, which may be the same or different, is a valence bond or an alkylene, substituted alkylene, alkenylene, substituted alkenylene, arylene or substituted arylene radical.

The term valence bond means a single covalent bond directly linking two atoms of the main chain of the first compound or the second compound together.

An isocyanate precursor group is a group that is capable of forming an isocyanate group under the reaction conditions used to prepare polyurea gels, for example, a blocked isocyanate group, that is, an isocyanate group that has been treated (reacted) with a compound containing an active hydrogen atom (such as substituted or unsubstituted phenols, oximes or alkyl substituted malonates) to produce a relatively non-reactive compound from which the isocyanate may be regenerated by heating, for example to 150° C. Examples of such relatively unreactive compounds include the carbamates produced by the reaction of an isocyanate with an alkyl substituted phenol or an aromatic oxime. The blocking group may be released by heat alone or by reacting the blocked isocyanate with a monomeric or polymeric compound also containing active hydrogen atoms such as aliphatic or aromatic amines or alcohols.

Suitable amines include but are not limited to alpha-amino-propyl, omega-amino terminated polypropylene oxides with molecular weights of from 200 to 20,000, alpha-amino-ethyl, omega-amino terminated polyethylene oxides with molecular weights of from 200 to 20,000, alpha-amino-ethyl, omega-amino terminated polytetramethylene oxides with molecular weights of from 250 to 25,000 and the like; dimer diamine which has the approximate structure:

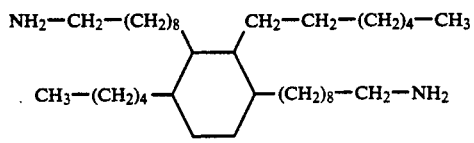

and amine rich polyamide resins such as the reaction product of dimer diacid, which has the approximate structure:

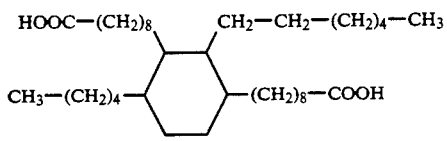

or other dicarboxylic acids with an excess of a substituted or unsubstituted alkylene or arylene diamine; amine terminated amine-epoxy adducts such as the reaction product of a bisphenol A epoxy resin with diamines such as diethylene triamine; 4,4'-diamino-3,3'-dimethyldicyclohexylmethane; aromatic amines such as diaminodiphenyl sulfone, ethylenebisaniline, methylenedianiline, diethyltoluenediamine, 3,5-dimethylthio-2,4-toluenediamine and the like; amine terminated polybutadienes, amine terminated butadiene-acrylonitrile copolymers and amine terminated polyorganosiloxanes such as aminopropyldimethyl terminated polydimethylsiloxanes, aminobutyldimethyl terminated polydimethylsiloxanes and the like. Amongst the suitable amine rich polyamides may be mentioned those available from Henkel Corporation under the tradenames Versamid 100, Versamid 115, Versamid 125 and Versamid 140. Among the suitable epoxy amine adducts may be mentioned those available from Henkel Corporation under the tradename Versamine, such as Versamine C30.

Suitable polyisocyanates or precursors thereof include organic isocyanates having at least two isocyanate groups per molecule. The polyisocyanates can be of low, high or intermediate molecular weight and can be any of a wide variety of organic polyisocyanates including ethylene di-isocyanate, trimethylene di-isocyanate, dodecamethylene di-isocyanate, hexamethylene di-isocyanate, hexamethylene di-isocyanate trimer, tetraethylene di-isocyanate, pentamethylene di-isocyanate, propylene-1,2-diisocyanate, 2,3-dimethyl-tetramethylene di-isocyanate, 1,4-diisocyanato cyclohexane, methyl-hexamethylene di-isocyanate, 3-isocyanatomethyl-3,5,5-trimethylcyclohexyl isocyanate, cyclopentene-1,3-diisocyanate, p-phenylene di-isocyanate, naphthalene di-isocyanate, 4,4'-diphenylene methane di-isocyanate, 4,4'-diphenylene propane di-isocyanate, tetramethylxylylene di-isocyanate (TMXDI), 1,2,3,4-tetraisocyanato butane, butane-1,2,3-triisocyanate, and isocyanate-containing linear and branched aromatic, polyisocyanates which may be polymeric in nature such as polyether and polyester prepolymers polyisocyanates. Representative examples of such prepolymers are sold, for example, by Mobay Corporation under the tradenames Desmocap 11A and Desmocap 12.

The diluent may be any organic liquid having the desired degree of compatibility with the polyurea. Thus crosslinked gels of the invention can be prepared having a wide range of solubility parameters. In particular, this invention can provide gel compositions of higher solubility parameter than has been contemplated hitherto for uses such as those described hereinabove. Accordingly, in some applications, preferred diluents exhibit solubility parameters of at least 7.6 Hildebrands, more preferably at least 8.0 Hildebrands and most preferably at least 9.0 Hildebrands. Suitable diluents include mineral oils, aliphatic hydrocarbon oils such as those sold under the trademark "Permethyl" and having the general structure $H[-C(CH_3)_2]_n-H$ where n is greater than 10 and having viscosities of about 35 to about 50 cps; at least partially aromatic, preferably polynuclear, hydrocarbon oils, such as partially hydrogenated terphenyl; esters of aliphatic, aromatic and inorganic acids, such esters including diethyl hexyl phthalate, ditridecylphthalate, triethylhexyl trimellitate, dibutyl phthalate, butyl benzyl phthalate, diethyl phthalate, ethylhexyldiphenyl phosphate, tricresyl phosphate, and t-butylphenyl diphenyl phosphate; and sulphonamides, such as N-ethyl-o,p-toluene sulphonamide; silicone fluids such as dimethylsilicones with viscosities of from about 1 to about $10^6$ centipoises (cp) (as described by Dubrow in published international patent application WO 90/10035 (1990), the disclosure of which is hereby incorporated for all purposes within); and the like and mixtures of any two or more of the above. Preferably the solubility parameters of the gel and the solubility parameter of the diluent (or average solubility parameter of the diluents, if there is more than one liquid diluent) differ by less than 2 Hildebrands, more preferably by less than 1 Hildebrands most preferably by less than 0.5 Hildebrands.

If desired, the reactants may also include one or more hydroxy compounds as diluents. We have found that the amines react so much more rapidly than do hydroxy compounds with the isocyanate or isocyanate precursor compounds that the latter act essentially as inert diluents.

The curable compositions of this invention and the compositions made according to this invention may contain various additional ingredients such as flame retardants, corrosion inhibitors, antioxidants, UV light stabilizers, fungicides and other biocides, pigments and fillers to enhance or decrease thermal or electrical conductivity and fillers to adjust density or other physical properties. Such additives or fillers also may be used to regulate or affect the rate of extent of cure and crosslinking and affect the overall cost of the final composition. Particularly useful ingredients for incorporation in gels of the present invention are described by Dittmer and Dubrow in U.S. Pat. No. 4,852,646 (1989) and by Holland and Rost in published European patent application EP 0,324,255 (1989), the disclosures of which are incorporated by reference herein for all purposes.

Advantageously, the polyurea gels of the invention contain stabilizers and antioxidants, for example, one or more of 1,6-hexamethylene bis(3,5-di-tert-butyl-4-hydroxyhydrocinnamate), tetrakis[methylene 3-(3',5'-di-tert-butyl-4'-hydroxyphenyl)propionate]methane, octadecyl 3-(3',5'-di-tert-butyl-4'-hydroxyphenyl)propionate, N,N'-bis[3-(3',5'-di-tert-butyl-4'-hydroxyphenyl)propionate] hydrazine, thiodiethylene bis(3,5-di-tert-butyl-4-hydroxyhydrocinnamate), triethylene glycol bis(3-(3'-tert-butyl-4'-hydroxy-5'-methylphenyl)-propionate, octadecyl-3(3',5'-di-tert-4'-hydroxyphenyl)-propionate, N,N'-hexamethylene bis(3,5-di-tert-butyl-4-hydroxy-hydrocinnamamide), 2-methyl-4,6-bis[(octylthio)methyl]phenol, 4,4'-thiobis-6-tert-butyl-m-cresol), 2,2'-methylene bis(4-methyl-6-tert-butyl phenol), 4,4'-methylene bis(2,6-di-tert-butyl phenol), di-tert-butyl phenol, 2,2'-methylene-bis(4-ethyl-6-tert-butyl)phenol, the reaction product of dicyclopentadiene and ortho-tert-butylhydroxytoluene, 2(2'-hydroxy-5'-methylphenyl)benzotriazole, 2(2'-hydroxy-3',5'-di-tert-amylphenyl)benzotriazole, 2(2'-hydroxy-3',5'-di-tert-butylphenyl)-5-chlorobenzotriazole, bis(1,2,2,6,6-pentamethyl-4-piperidinyl)sebacate, the condensation product of dimethyl succinate with 4-hydroxy-2,2,6,6-tetramethyl-1-piperidine ethanol, bis(2,2,6,6-tetramethyl-4-piperidyl)sebacate, {[3,5-bis(1,1-dimethylethyl)-4-hydroxyphenyl]methyl}butyl-bis(1,2,2,6,6-pentamethyl-4-piperidinyl) ester, nickel bis[O-ethyl(3,5-di-tert-butyl-4-hydroxybenzyl]phosphinate, 4,4'-bis (α,α-dimethylbenzyl) diphenylamine, products of the condensation reaction of diphenylamine with acetone, arylated diphenylamine, octylated diphenylamine, poly((6-((1,1,3,3-tetramethylbutyl)amino)-s-triazine-2,4-diyl)((2,2,6,6-tetramethyl-4-piperidyl)imino)hexamethylene((2,2,6,6-tetramethyl-4-piperidyl)imino)), zinc dialkyl dithiocarbamates, zinc dialkyldithiophosphates, dialkyl thiodipropionates, distearylpentaerythritol diphosphite, trisnonylphenylphosphite, dilauryl hydrogen phosphinate, tris(3,5-di-tert-butylphenyl) phosphite, tetra(3,5-di-tert-butylphenyl)-4,4'-biphenylene diphosphite, polycarbodiimide and the like.

For greater oxidative stability it is preferred that the polyurea gels of the invention be "amine rich", that is that the ratio of amine to isocyanate in the starting materials used to prepare the polyurea be greater than 1, for example, greater than 1.02 to 1 more preferably greater than 1.05 to 1, for example greater than 1.1 to 1.

The term "gel time" as used in this specification means the time which elapses between that time at which the isocyanate, amine and other ingredients are first mixed together and that time at which the mixture ceases to flow under its own weight. This moment may be ascertained quite simply by tipping the container in which the reacting ingredients are contained and observing if any flow occurs. Reproducibilities of $+25\%$ can be obtained. For some applications the gel time at 25° C. is preferably less than 900 seconds, preferably less than 600 seconds, more preferably less than 600 seconds, for example less than 200 seconds, most preferably less than 100 seconds and especially less than 50 seconds. For other applications, where a longer open time is desirable so that the uncured gel can be worked with, such as transferring from one container to the other, longer gel times, in the tens of minutes or even in hours, is preferable. Those skilled in the art will determine readily which gel time is most desirable for their particular application. An advantage of this invention is that, by selecting the appropriate combination of isocyanate and amine components, compositions with different cure times can be formulated.

Where a longer cure time is desired, the gel time can be made longer by blocking the amine groups with a ketone or aldehyde, such as has been done with epoxy resin coatings. The carbonyl groups in ketones and aldehydes react with amine groups to form imine groups, which are unreactive with isocyanate groups. In the presence of water (for example atmospheric moisture), imine groups are hydrolyzed to regenerate the amine groups, which are reactive. By mixing an isocyanate component with an amine component having blocked amine groups, the gel time can be increased, for example from about two minutes to over 24 hours.

Figure 4:
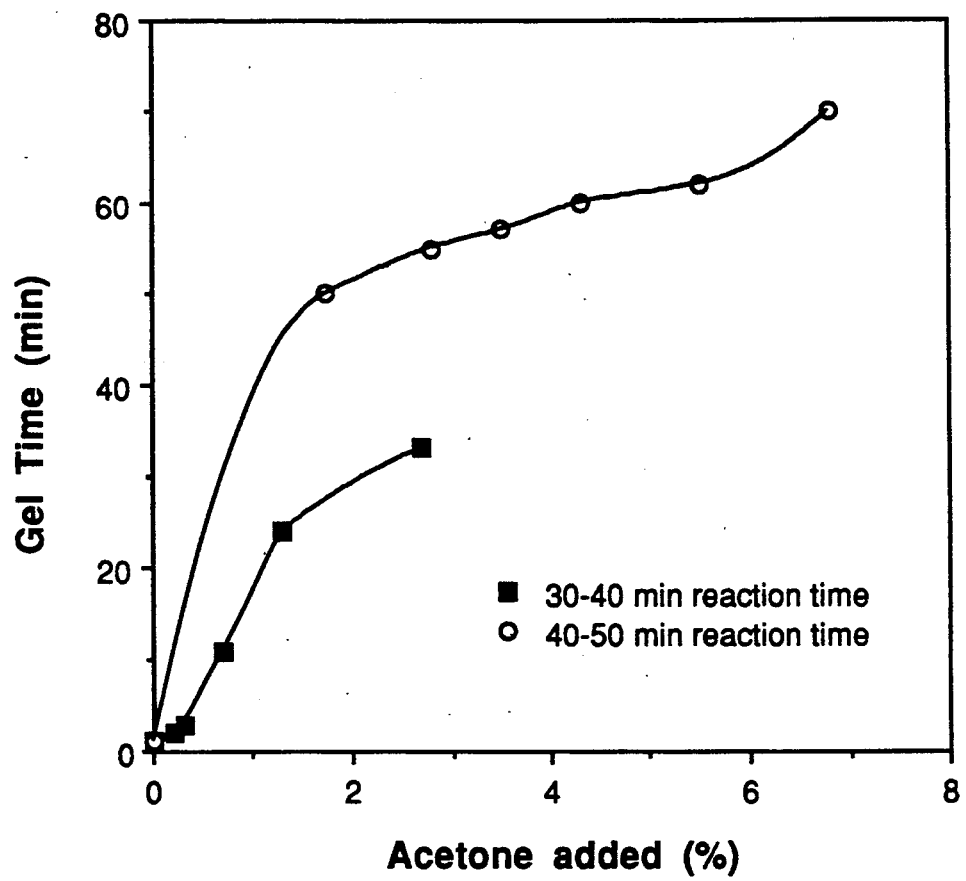
FIGS. 4 and 5 show the effect of various ketones on the gel time of gels of this invention.

FIG. 4 shows the effect of when different amounts of acetone were allowed to react with the amine component (Jeffamine T5000) of a gel formulation for different amounts of time, before mixing with the isocyanate component (dimer di-isocyanate). Increasing the amount of acetone increased the gel time from about 2 min to over 60 min, indicating deactivation of the amine. A greater effect was observed after a 40-50 min reaction time compared to a 30-40 min reaction time, indicating that the deactivation process (reaction of amine with the ketone) is still incomplete after 30-40 min.

Figure 5:
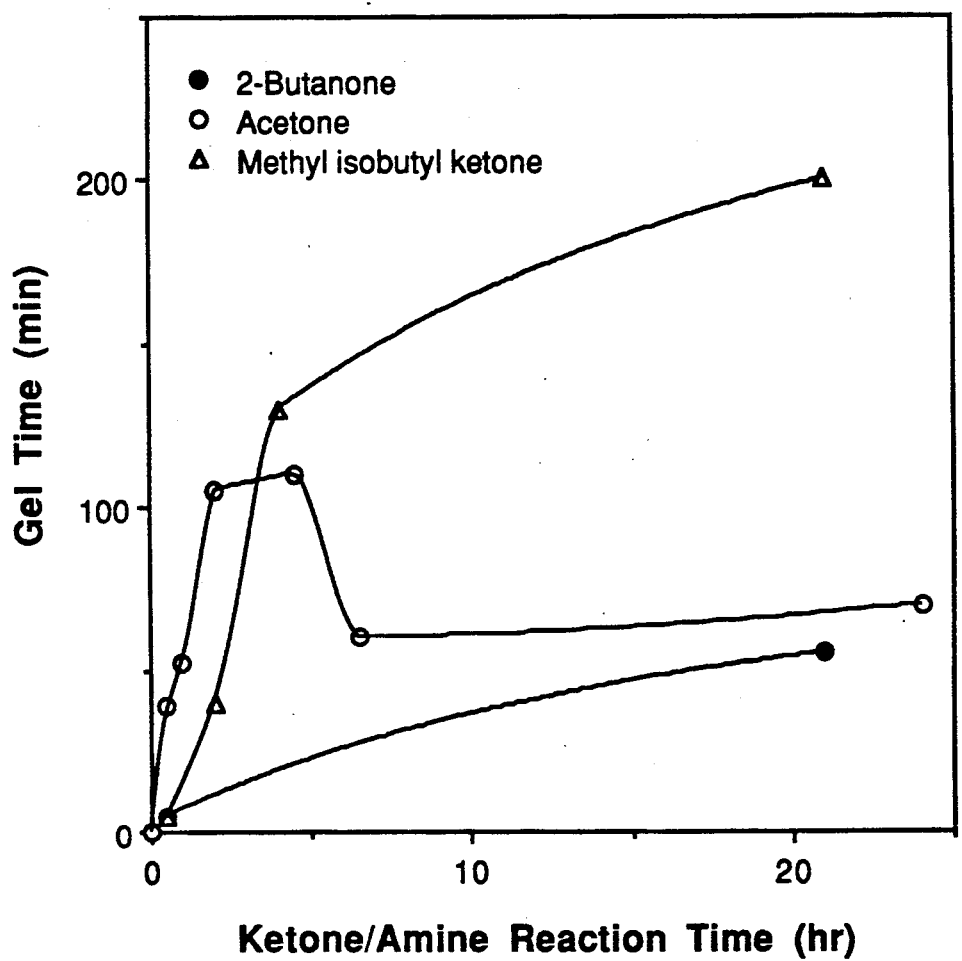

FIG. 5 compares the effectiveness of three different ketones, acetone, 2-butanone, and methyl isobutyl ketone (MIBK) in increasing the gel time of a gel based on dimer di-isocyanate, Jeffamine T-5000, and Therminol 66. Methyl isobutyl ketone is seen to be the more effective of the three.

Figure 6:
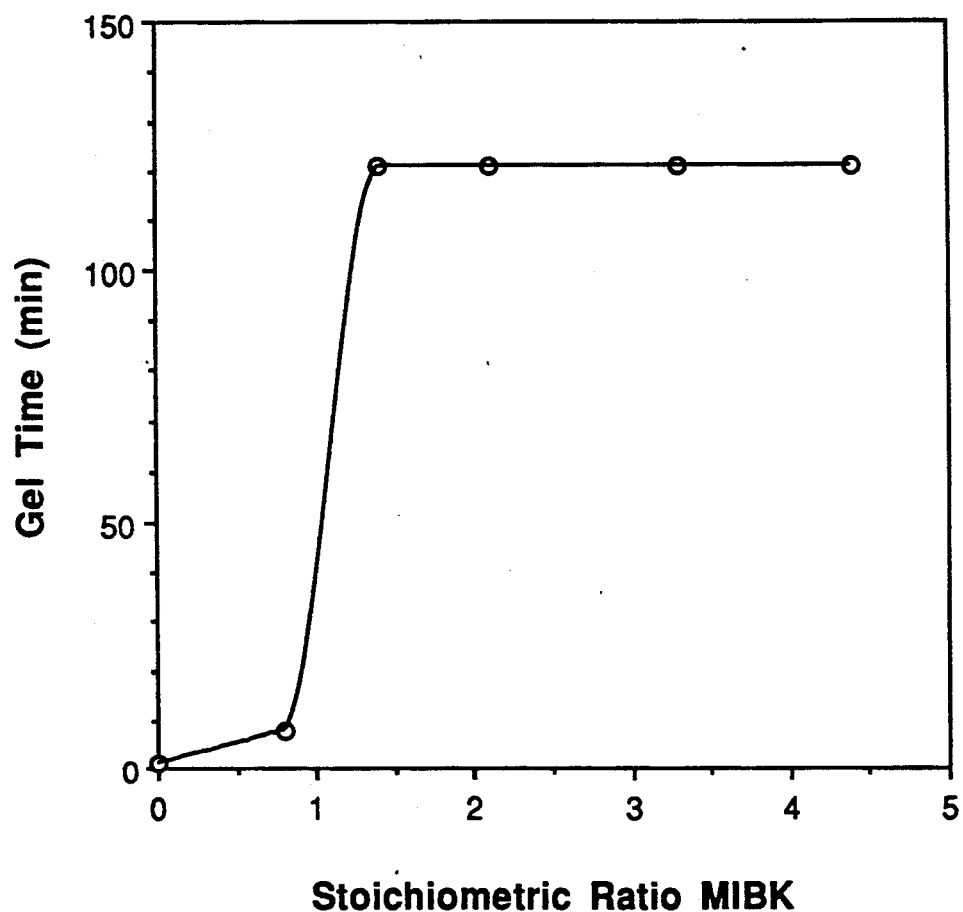
FIGS. 6 and 7 show the effect of the amount of ketone blocking agents on gel time and gel hardness.

FIG. 6 shows the effect of increasing the stoichiometric ratio of MIBK on the gel time of a dimer di-isocyanate/Jeffamine T-5000 gel, after allowing the MIBK to react with the amine for 3 hr at 60° C. and then 21 hr at room temperature. There is a plateau at higher MIBK levels, indicating complete reaction with the amine groups.

Figure 7:
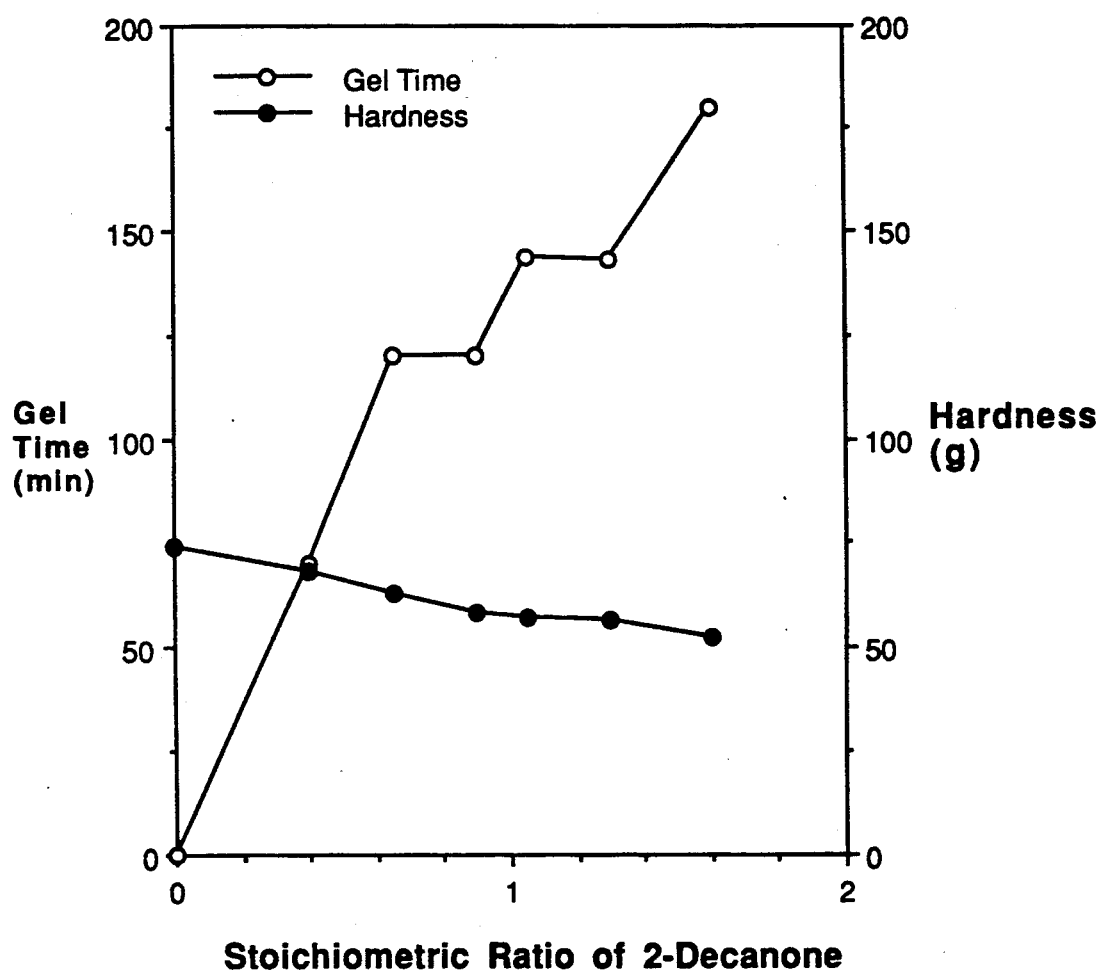
Figure 8:
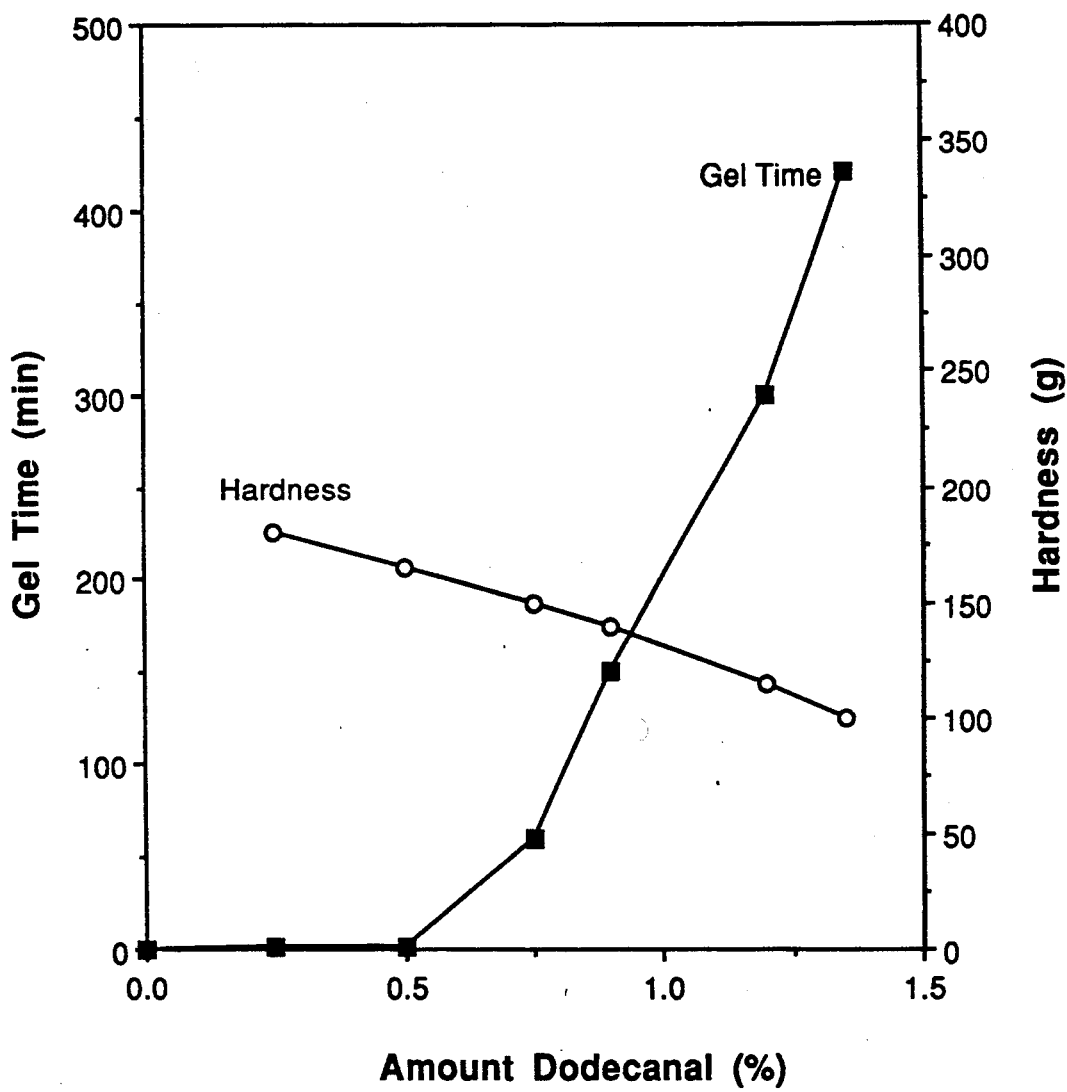
FIG. 8 shows the effect of the amount of an aldehyde blocking agent on gel time and gel hardness.

FIG. 7 shows that although the gel time is affected by the addition of a ketone (in this instance 2-decanone), physical properties (as measured by the hardness) is little affected. FIG. 8 shows a similar effect is obtained with an aldehyde (dodecanal) on a gel made from Desmodur N-3300 and Jeffamine D-4000 after a reaction time of 16 hr at 60° C. plus one hr at room temperature.

Numerous ketones and aldehydes can be used as blocking agents for amines. Suitable ketones and aldehydes include but are not limited to acetone, 2-butanone (methyl ethyl ketone), methyl isobutyl ketone, 2-decanone, 2-undecanone, 3-tridecanone, 3-decanone, 10-nonadecanone, 4-hydroxy-4-methylpentanone, acetophenone, decanal, undecanal, dodecanal, benzaldehyde, and ethoxy-benzaldehyde. For applications where a volatile blocking agent is undesirable for one reason or another, higher molecular weight, less volatile blocking agents such as 2-decanone and 2-undecanone are preferred.

Figure 9:
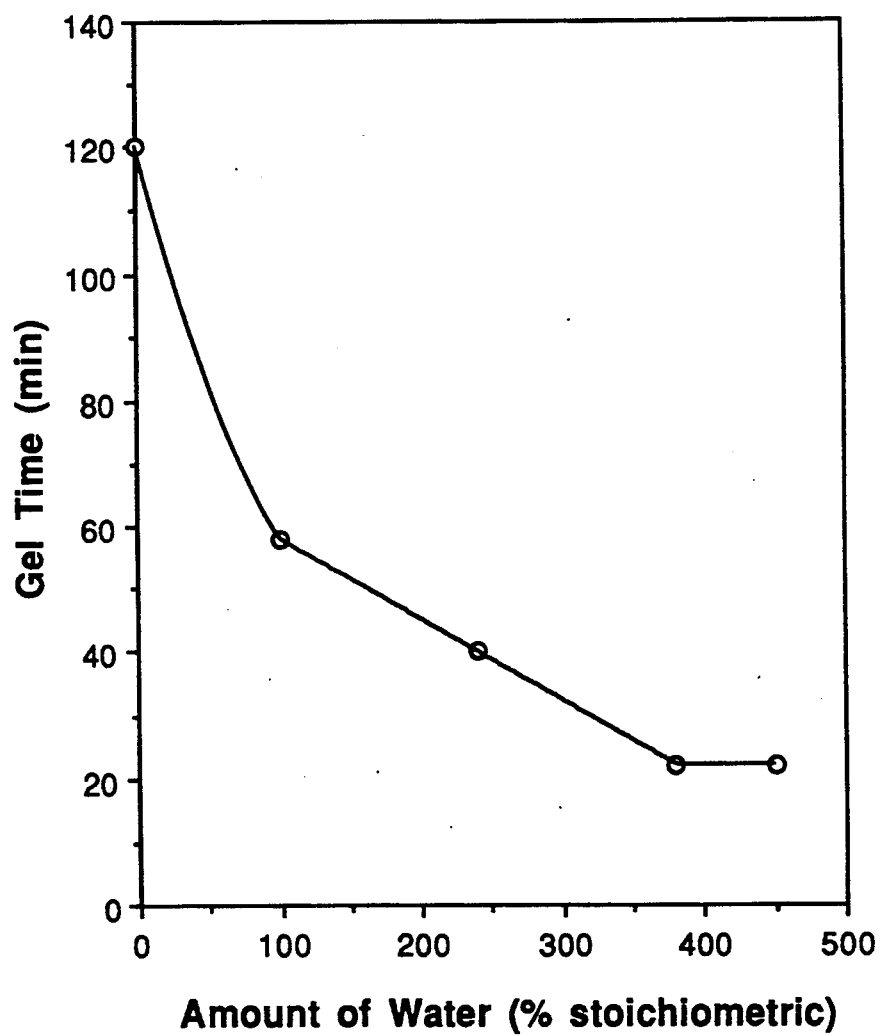
FIG. 9 shows the effect of water addition on gel time.

The equilibrium between imine on the one hand and ketone (or aldehyde) and amine on the other hand is affected by the amount of ambient moisture present. Increasing the amount of ambient water pushes the equilibrium towards ketone (or aldehyde) and amine, and consequently decreases the gel time. This effect is illustrated graphically in FIG. 9 for a gel from dimer di-isocyanate and Jeffamine T-5000 blocked with 2-undecanone (19.5 hr at 60° C. plus 2.5 hr at room temperature). "One-part" gels with very long shelf lives can be made from dried blocked amine, isocyanate, and extender fluid. To get the gel to cure, one can simply expose the uncured gel to atmospheric moisture, or, preferably, add water to it.

The invention is illustrated in the following Examples.

EXAMPLE 1

Preparation of Polyureas Using Isocyanates

This procedure describes in general terms the method used to make formulations 1-1 to 1-15 listed below. Each gel is prepared using three basic ingredients, namely 1) A mixture of tetramethylxylylenediisocyanate (TMXDI, available from American Cyanamid Co.) which has the following structure:

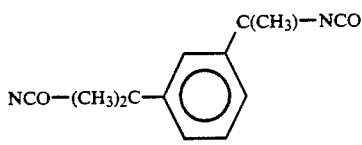

and dimer di-isocyanate (DDI 1410, available from Henkel Corporation) which has the approximate structure:

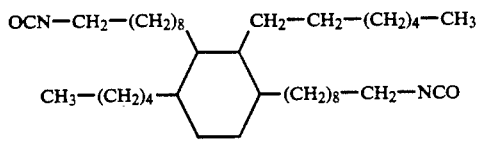

in the amounts specified in Table 2.

2) An amine terminated polypropylene ether (either Jeffamine D-4000 which has a molecular weight of 4,000 and contains about two amine groups per molecule or the similar Jeffamine T-5000 which has a molecular weight of 5,000 and contains about three amine groups per molecule.

3) An inert diluent as identified in Table 1 below.

TABLE 1

| Commerical or Abbreviated Name | Chemical Name | Supplied by |
|---|---|---|
| DBP | Dibutyl phthalate | Eastman Kodak |
| DTDP | Ditridecyl phthalate | Eastman Kodak |
| Phosflex 362 | Diphenyl octyl/triphenylphosphate mixture | AKZO |
| DOP | Dioctyl phthalate | Ashland Chemicals |
| Jayflex DTDP | Ditridecyl phthalate | Exxon Chemicals |
| Therminol 60 | Ethyl benzene, benzylated | Monsanto Chemicals |
| Therminol 66 | Partially hydrogenated terphenyls | Monsanto Chemicals |
| Shellflex 371 | Hydrocarbon oil | Shell Chemicals |
| Santicizer 154 | t-Butylphenyl diphenyl phosphate | Monsanto Chemicals |
| Santicizer 141 | 2-Ethylhexyl diphenyl | Monsanto Chemicals |
| Santicizer 160 | Butyl benzyl phthalate | Monsanto Chemicals |
| DEP | Diethyl phthalate | Eastman Kodak |

TABLE 1-continued

| Commerical or Abbreviated Name | Chemical Name | Supplied by |
|---|---|---|
| HB40 | Partially hydrogenated terphenyls | Monsanto Chemicals |
| PPG-10225 | Propylene glycol | Union Carbide |
| Ketjenflex 8 | N-Ethyl-o/p-toluene sulfonamide | AKZO |
| TOTM | Tri-2-ethylhexyl trimellitate | C. P. Hall |

We have found that the reaction of the isocyanate with an amine, even when highly diluted with an extender, is so rapid that two masterbatches, one for the isocyanate (Part A) and one for the amine (Part B), are highly desirable. These masterbatches generally contain equal volumes or equal weights of materials and are very rapidly mixed together to start the reaction. Part A contains the isocyanate, with part of the diluent(s), stabilizers and any fillers, etc. Part B contains the amine(s), the rest of the diluent(s) and stabilizers etc.

In preparing gels in all of the following examples, the correct amounts of the ingredients were weighed on an analytical balance (accuracy 0.01 g) and blended to form Parts A and B. Part A and Part B were then mixed rapidly together (gel times as short as 10 seconds have been observed) and cast into beakers or onto flat sheets. Typically the gel was cast rapidly into a 6"×6"×0.125" (15.24×15.24×0.3175 cm) mold and cured at room temperature. Gel properties were measured after the gel had cured for 24 hours at room temperature. Elongation was determined using tensile bars die cut from the molded slabs using procedures described in ASTM D419. For hardness measurements 60 g mixed formulation were placed in 100 mL beakers and cured. The hardness was measured using a Voland-Stevens Texture Analyser Model LFRA-1000 with a 5 g trigger on a ¼ in (0.635 cm) ball probe. The probe was advanced down into the gel to a depth of 4 mm at a rate of 0.2 mm per second. Stress relaxation was measured as the % decrease in hardness when the hardness was measured again 1 minute after the initial hardness was measured with the probe being held at constant depth therebetween. Tack values were measured as the maximum force observed on withdrawing the probe from the gel after the hardness has been measured. Results obtained for gels prepared using DBP as diluent are given in Table 2.

TABLE 2

| Example No. | Weight DBP (g) | Weight DDI (g) | Weight D4000 (g) | Weight T5000 (g) | Hardness (g) | Tack (g) | Stress Relaxation (%) | Gel Time (sec) |
|---|---|---|---|---|---|---|---|---|
| 2-1 | 20.00 | 2.75 | 12.06 | 5.18 | 5 | 13 | — | 60 |
| 2-2 | 20.00 | 2.79 | 10.32 | 6.89 | 13 | 33 | 36 | 35 |
| 2-3 | 20.00 | 2.90 | 8.60 | 8.60 | 40 | 34 | 18 | 30 |
| 2-4 | 20.00 | 2.82 | 6.88 | 10.33 | 60 | 33 | 13 | 25 |
| 2-5 | 26.00 | 1.95 | 7.23 | 4.84 | 14 | 28 | 15 | 70 |
| 2-6 | 26.00 | 1.96 | 6.02 | 6.02 | 30 | 27 | 6.5 | 45 |
| 2-7 | 26.00 | 1.99 | 4.00 | 8.00 | 71 | 14 | 3.5 | 25 |
| 2-8 | 26.00 | 2.01 | 2.39 | 9.00 | 119 | 10 | 4.0 | 20 |
| 2-9 | 29.62 | 1.38 | 5.11 | 3.41 | 4 | 15 | 10 | 240 |
| 2-10 | 29.72 | 1.39 | 4.26 | 4.26 | 17 | 12 | 13 | 100 |
| 2-11 | 29.80 | 1.42 | 2.84 | 5.68 | 40 | 7 | 4.0 | 50 |
| 2-12 | 29.96 | 1.42 | 1.70 | 6.02 | 73 | 2 | 4.5 | 40 |
| 2-13 | 32.00 | 1.12 | 3.44 | 3.44 | 8 | 10 | 6.0 | 180 |
| 2-14 | 32.00 | 1.13 | 2.29 | 4.58 | 25 | 6 | 1.2 | 70 |
| 2-15 | 32.00 | 1.15 | 1.37 | 5.48 | 47 | 4 | 2.0 | 55 |

EXAMPLE 2

Table 3 shows selected physical properties of gels prepared, using the procedure of Example 1, from various mixtures of a polyetheramine (Jeffamine D-2000 available from Texaco Chemical Co., which is an amine terminated polypropylene oxide and which has a molecular weight of 2,000 and an average of two terminal amine groups per molecule) and T-5000 in the presence of various concentrations of dibutyl phthalate (DBP) or Phosflex 362 (diphenyloctyl/triphenyl phosphate mixture) as diluent.

4) The diluent: a phthalate ester, ether dioctyl phthalate (DOP, obtained from Aldrich Chemical) or ditridecyl phthalate (DTDP, obtained from Exxon Chemical).

Ingredient 3 is used at a concentration of 1% of the mixture for all the formulations. Ingredients were weighed on an analytical balance (accuracy 0.01 g) then mixed with an overhead stirrer equipped with a propeller blade. The blended mixture was cast into a 6"×6"×0.125 (15.24×15.24×0.3175 cm) mold and cured at 120° C. for 17 hours in an air circulating oven. Elongation was determined using tensile bars die cut from the molded slabs using procedures described in

TABLE 3

| Sample No. | Diluent Type | Diluent Wt. (g) | Isocyanate Type | Isocyanate Wt. (g) | Weight D2000 (g) | Weight T5000 (g) | Hardness (g) | Gel time (sec) | Dielectric constant of diluent |
|---|---|---|---|---|---|---|---|---|---|
| 3-1 | DBP | 74.54 | DDI | 3.85 | 4.93 | 14.79 | 25 | 75 | 6.45 |
| 3-2 | 362 | 74.54 | DDI | 3.85 | 4.93 | 14.79 | 25 | 75 | 7.52 |
| 3-3 | DBP | 72.67 | TMXDI | 1.49 | — | 24.22 | 110 | 240 | 6.45 |
| 3-4 | DBP | 63.74 | DDI | 4.61 | — | 29.75 | 110 | 25 | 6.45 |
| 3-5 | DTDP | 44.86 | TMXDI | 0.80 | — | 14.15 | 37 | >300 | 4.06 |
| 3-6 | DBP | 30.00 | TMXDI | 0.61 | — | 10.00 | 108 | 240 | 6.45 |

EXAMPLES 3

Preparation of Polyureas Using Blocked Isocyanates

This procedure describes in general terms the method used to make formulations of examples 4-1 to 4-19 listed below, which comprise gels of the invention. Each gel is prepared from four basic ingredients:

1) The blocked isocyanate: Desmocap IIA and Desmocap 12 (both available from Mobay). Desmocap IIA (equivalent weight about 1750) is a trifunctional and Desmocap 12 (equivalent weight about 2470) a difunctional blocked isocyanate oligomer prepared from polypropylene glycol, toluene di-isocyanate and an alkyl phenol.

2) The curative: an amine terminated polypropylene oxide (Jeffamine D-400 or Jeffamine D-2000 available from Texaco Corporation) or 4,4'-diamino-3,3'-dimethyldicyclohexylmethane (DDD, available from BASF). Jeffamine D-400 (molecular weight about 400) and D-2000 (molecular weight about 2,000) are difunctional amine terminated polypropylene ether oligomers.

3) An antioxidant: Irganox 1035 available from Ciba Geigy.

ASTM D419. Three 20 mL scintillation vials were filled with 12 g each of the mixture and cured at 120° C. for 17 hours in an air circulating oven. For hardness measurements three 20 mL scintillation vials were filled with 12 g each of a mixed formulation and cured at 120° C. for 17 hours in an air circulating oven. The hardness was determined for each formulation sample using a Voland Texture Analyzer as above. The results are shown on Table 4.

TABLE 4

| Example No. | Wt. DOP (g) | Wt. DTDP (g) | Curative | Wt. Curative (g) | Wt. D11A (g) | Wt. D12 (g) | Hardness (g) | Elongation (%) |
|---|---|---|---|---|---|---|---|---|
| 4-1 | 150.0 | — | D400 | 3.36 | 24.00 | 6.00 | 45 | 400 |
| 4-2 | 150.0 | — | D400 | 3.24 | 21.00 | 9.00 | 31 | 550 |
| 4-3 | 150.0 | — | D400 | 3.12 | 15.00 | 12.00 | 15 | 700 |
| 4-4 | 150.0 | — | D400 | 3.10 | 15.00 | 15.00 | 7 | 1000 |
| 4-5 | 45.0 | — | D400 | 3.00 | 12.00 | 18.00 | 55 | 1050 |
| 4-6 | 45.0 | — | D400 | 2.85 | 9.00 | 21.00 | 14 | 1550 |
| 4-7 | 22.5 | — | D2000 | 4.07 | 7.50 | 7.50 | 200 | — |
| 4-8 | 22.5 | — | D2000 | 4.28 | 7.50 | 7.50 | 257 | — |
| 4-9 | 22.5 | — | D2000 | 4.50 | 7.50 | 7.50 | 236 | — |
| 4-10 | 90.0 | — | DDD | 1.84 | 6.00 | 24.00 | 136 | — |
| 4-11 | 90.0 | — | DDD | 1.74 | 6.00 | 24.00 | 156 | — |
| 4-12 | 90.0 | — | DDD | 1.65 | 6.00 | 24.00 | 200 | — |
| 4-13 | — | 65.0 | D2000 | 10.01 | 15.81 | 6.67 | 7 | — |
| 4-14 | — | 65.0 | D2000 | 10.41 | 15.53 | 6.66 | 19 | — |
| 4-15 | — | 65.0 | D2000 | 10.80 | 15.26 | 6.54 | 35 | — |
| 4-16 | — | 65.0 | D2000 | 11.17 | 15.00 | 6.43 | 40 | — |
| 4-17 | — | 65.0 | D2000 | 11.53 | 14.75 | 6.32 | 36 | — |
| 4-18 | — | 65.0 | D2000 | 11.88 | 14.50 | 6.21 | 25 | — |
| 4-19 | — | 81.7 | D2000 | 11.17 | 15.00 | 6.43 | 22 | 1250 |

EXAMPLE 4

Using the procedure of Example 3, gels were prepared from a difunctional amine, 4,4'-diamino-3,3'-dimethyldicyclohexyl methane (DDD, equivalent weight 119) and various mixtures of a branched isocyanate terminated urethane polymer (Desmocap 11A, available from Mobay Corporation) which contains about 2.4% blocked isocyanate group and has an equivalent weight of about 1750 and a linear aromatic urethane polymer with ether groups (Desmocap 12 available from Mobay Corporation) which contains about 1.7% blocked isocyanate and has an equivalent weight of about 2470. These gels were prepared in the presence of various concentrations of dioctyl phthalate. The results are shown in Table 5.

TABLE 5

| Sample No. | Ratio of 11A to 12 (Wt./Wt.) | Diluent concentration (%) | Approximate molecular weight between crosslinks | Voland hardness (g) |
|---|---|---|---|---|
| 5-1 | 1:1 | 75 | 7,000 | 456 |
| 5-2 | 1:1 | 85 | 7,000 | 137 |
| 5-3 | 1:1 | 90 | 7,000 | 34 |
| 5-4 | 1:1 | 95 | 7,000 | ~2 |
| 5-5 | 1:4 | 75 | 20,000 | 201 |
| 5-6 | 1:4 | 85 | 20,000 | 71 |
| 5-6 | 1:4 | 90 | 20,000 | 18 |
| 5-8 | 1:4 | 95 | 20,000 | <5 |

EXAMPLE 5

Using the general procedure of Example 1, gels were prepared from a variety of diamines and or triamines. The formulations used and the evaluation results are illustrated in Tables 6, 7 and 8. In Table 6, gel samples 6-1 to 6-12 illustrate the gel properties obtained using Therminol 66 as the diluent and varying the polyurea concentration. Gel sample 6-13 omits the Jeffamine D2000 but is otherwise similar. In Table 7 gel samples 7-1 and 7-2 show gels made using mixtures of Shellflex 371 and Santicizer 141 or DEP as diluent. Gel samples 7-3 to 7-7 show how gel properties vary with the concentration of the polyurea. In Table 8, a variety of diluents have been used to prepare the gels. Gel samples 8-5 to 8-8 show how the gel properties at 20% polymer loading vary using HB-40 as diluent and various-triamine ratios. Gel samples 8-9 uses a polyol (PPG-1025) as well as an amine to obtain a polyurea gel in a polyol diluent. In sample 8-14 a stabilizer (Irganox 1090 from Ciba Geigy) is added to the composition used to prepare the gel. Gel samples 8-20 to 8-23 show how the diluent mixture may be varied to alter the solubility parameter of the gel.

TABLE 6

| Example No. | Isocyanate DDI | Amine T5000 | Amine D2000 | Diluent Therminol 66 | Gel Time (sec) | Hardness (g) | Stress Relaxation (%) | Tack (g) |
|---|---|---|---|---|---|---|---|---|
| 6-1 | 2.22 | 6.00 | 4.00 | 48.88 | 240 | 6 | 53.3 | 17.0 |
| 6-2 | 2.06 | 7.00 | 3.00 | 28.24 | 205 | 19 | 81.0 | 14.0 |
| 6-3 | 1.91 | 8.00 | 2.00 | 47.64 | 175 | 37 | 91.4 | 13.0 |
| 6-4 | 2.22 | 6.00 | 4.00 | 36.66 | 105 | 14 | 64.8 | 25.2 |
| 6-5 | 2.06 | 7.00 | 3.00 | 36.18 | 85 | 22 | 73.1 | 27.8 |
| 6-6 | 1.91 | 8.00 | 2.00 | 35.72 | 70 | 54 | 91.4 | 14.0 |
| 6-7 | 2.30 | 5.50 | 4.50 | 28.70 | 65 | 7 | 32.9 | 28.5 |
| 6-8 | 2.14 | 6.50 | 3.50 | 28.32 | 55 | 26 | 67.2 | 38.5 |
| 6-9 | 1.99 | 7.50 | 2.50 | 27.98 | 45 | 46 | 80.1 | 37.6 |
| 6-10 | 2.38 | 5.00 | 5.00 | 22.98 | 55 | 13 | 31.6 | 32.5 |
| 6-11 | 2.22 | 6.00 | 4.00 | 22.70 | 50 | 21 | 47.2 | 36.0 |
| 6-12 | 2.06 | 7.00 | 3.00 | 22.40 | 40 | 36 | 61.6 | 34.5 |
| 6-13 | 1.60 | 10.00 | — | 46.40 | 90 | 82 | — | — |

TABLE 7

| Sample | Isocyanate DDI | Amine T5000 | Diluent | Other | Gel Time (sec) | Hardness (g) | Tack (g) |
|---|---|---|---|---|---|---|---|
| 7-1 | 1.45 | 10.00 | 22.90[b] | 22.90[d] | 25 | 25 | — |
| 7-2 | 1.45 | 10.00 | 22.90[b] DBP | 22.90[e] Concn.* (%) | 120 | 21 | — |
| 7-3 | 2.01 | 11.74 | 41.24 | 25.00 | 25 | 130 | 0.0 |
| 7-4 | 1.61 | 9.39 | 44.00 | 20.00 | 30 | 92 | 0.0 |
| 7-5 | 1.20 | 7.04 | 46.75 | 15.00 | 75 | 46 | 0.0 |
| 7-6 | 1.01 | 5.87 | 48.12 | 12.50 | 95 | 21 | 0.0 |
| 7-7 | 0.81 | 4.70 | 49.50 | 10.00 | 180 | 14 | 1.0 |

Notes on Table 7:
[b]Shellflex 371;
[d]Santicizer 141;
[e]DEP;
*concentration of polyurea in gel composition.

TABLE 8

| Sample No. | Isocyanate DDI | Amine T3000 | Amine D2000 | Diluent as indicated | Other Material | Gel Time (sec) | Hardness (g) | Stress Relaxation (%) | Tack (g) |
|---|---|---|---|---|---|---|---|---|---|
| 8-1 | 1.90 | 7.50 | — | 35.70[h] | — | 50 | 23 | 17.5 | 7.5 |
| 8-2 | 1.45 | 10.00 | — | 46.00[d] | — | 35 | 58 | 2.0 | 1.0 |
| 8-3 | 1.45 | 10.00 | — | 46.00[c] | — | 45 | 49 | 5.0 | 3.0 |
| 8-4 | 1.45 | 10.00 | — | 46.00[f] | — | 110 | 39 | 3.0 | 0.0 |
| 8-5 | 1.96 | 7.00 | 3.00 | 47.84[f] | — | 240 | 7 | 37.8 | 11.0 |
| 8-6 | 1.79 | 8.00 | 2.00 | 47.16[f] | — | 240 | 19 | 12.5 | 9.2 |
| 8-7 | 1.61 | 9.00 | 1.00 | 46.44[f] | — | 200 | 17 | 10.0 | 16.0 |
| 8-8 | 1.45 | 10.00 | 0.00 | 45.80[f] | — | 115 | 50 | 2.0 | 5.0 |
| 8-9 | 1.56 | 10.00 | — | 46.24[j] | — | 30 | 36 | 9.0 | 4.5 |
| 8-10 | 1.45 | 10.00 | — | 45.76[f] | — | 45 | 50 | 4.5 | 3.5 |
| 8-11 | 1.46 | 10.00 | — | 45.76[k] | — | 35 | 63 | 1.3 | 1.2 |

TABLE 8-continued

| Sample No. | Isocyanate DDI | Amine T3000 | Amine D2000 | Diluent as indicated | Other Material | Gel Time (sec) | Hardness (g) | Stress Relaxation (%) | Tack (g) |
|---|---|---|---|---|---|---|---|---|---|
| 8-12 | 1.52 | 7.5 | 2.5[i] | 34.65[h] | — | 50 | 24 | 18.5 | 6.5 |
| 8-13 | 0.83 | 6.78 | — | 20.04[l] | — | 90 | 34 | 5.9 | 4.0 |
| 8-14 | 1.76 | 7.1 | 3.55[i] | 37.24[g] | 0.80[m] | 43 | — | 1.0 | 4.0 |
| 8-15 | 1.53 | 5.00 | — | 36.97[g] | — | 25 | 88 | 7.0 | 0.0 |
| 8-16 | 2.37 | 3.75 | 3.75 | 48.60[e] | 0.55[m] | 40 | 80* | — | — |
| 8-17 | 2.37 | 3.75 | 3.75 | 24.30[e] | 24.30[n] | 100 | 32* | — | — |
| 8-18 | 2.37 | 3.75 | 3.75 | 24.30[e] | 24.30[j] | 40 | 60* | — | — |
| 8-19 | 2.37 | 3.75 | 3.75 | 48.60[e] | — | 35 | 94* | — | — |
| 8-20 | 2.37 | 3.75 | 3.75 | 48.60[n] | — | >15 | 2 | — | — |
| 8-21 | 2.25 | 3.75 | 3.75 | 24.00[g] | 24.00[p] | 90 | 23 | — | — |
| 8-22 | 2.25 | 3.75 | 3.75 | 12.00[g] | 36.00[p] | 80 | 21 | — | — |
| 8-23 | 2.25 | 3.75 | 3.75 | 0.00 | 48.00[p] | 75 | 36 | 2.8 | — |

Notes on Table 8:
[c]Santicizer 154;
[d]Santicizer 141;
[e]DEP;
[f]HB-40;
[g]DBP;
[h]Santicizer 160;
[i]D4000;
[j]PPG-1025;
[k]Phosphlex 362;
[l]Jayflex DTDP;
[m]Antioxidant;
[n]Ketjenflex 8;
[p]TOTM;
*at 6 mm indentation.

EXAMPLE 6

Using the procedure of Example 1 gels were prepared using HB-40, Santicizer 154 and mixtures thereof as diluent. The formulations used 1.5 g of DDI and 10 g of Jeffamine T-5000 and the diluents were used at the concentrations shown in Table 9. The electrical properties of the gels produced thereby are also shown in Table 9.

TABLE 9

| Sample No. | Ratio of HB-40 to S-154 | Dielectric constant of diluent | Dielectric constant of gel | Volume resistivity of gel (ohm-cm) |
|---|---|---|---|---|
| 9-1 | 100 to 0 | 2.54 | 3.87 | $2.7 \times 10^{11}$ |
| 9-2 | 95 to 5 | 2.78 | 3.75 | $3.0 \times 10^{11}$ |
| 9-3 | 75 to 25 | 3.73 | 4.51 | $4.9 \times 10^{10}$ |
| 9-4 | 50 to 50 | 4.93 | 4.49 | $1.1 \times 10^{10}$ |
| 9-5 | 0 to 100 | 7.33 | 8.59 | $8.3 \times 10^{8}$ |

Using the procedure of Example 1 gels were prepared from a mixture of di-and triamines. The gels were prepared using the ingredients listed in Table 10. Properties of these gels are shown in Table 11.

TABLE 10

| Sample No. | Amine used | Chemical name or type | Supplier | Diluent | Polymer concentration (%) |
|---|---|---|---|---|---|
| 10-1 | Poly BD AT-C | Amine terminated polybutadiene | Arco | a, b | 15 |
| 10-2 | Hycar ATBN 1300 × 42 | Amine terminated polybutadiene/acrylonitrile liquid rubber | Goodrich | c | 7 |
| 10-3 | HC1101 | Polyetherdiamine | 3M | a, | 5 |
| 10-4 | PTHF-2100 | Bis(3-aminopropyl)polytetrahydrofuran (MW ~ 2100) | BASF | a | 12.5 |
| 10-5 | Jeffamine D-2000 | | Texaco | a, r | 15 |
| 10-6 | Jeffamine T-5000 | | Texaco | a, r | 25 |

Notes on Table 10:
a Therminol 60;
b Shellflex 371;
c Santicizer 154;
r Therminol 66.

TABLE 11

| Sample No. | Gelling Time (sec) | Hardness (g) | Stress Relaxation (%) | Tack (g) |
|---|---|---|---|---|
| 11-1 | 75 | 71 | 1 | 1.5 |
| 11-2 | 5 | 68 | — | — |
| 11-3 | 45 | 38 | — | — |
| 11-4 | 15 | 176 | — | — |
| 11-5 | 18 | 152 | — | — |
| 11-6 | <10 | 400 | — | — |

EXAMPLE 7

Using the procedure of Example 1 gels were prepared from a multifunctional polyisocyanate (Desmodur N-3300 supplied by Mobay Chemicals). This polyisocyanate is understood to be prepared by the reaction of excess hexamethylene di-isocyanate with a

EXAMPLE 8

In an experiment to demonstrate the improved heat aging performance of certain polyurea gels when compared with similar polyurethane gels, gel formulations were prepared, using the same diluent, to have similar polymer networks and crosslink densities. Two polyurea gels which are examples of this invention were compared with two polyurethane gels which are not examples of this invention. The formulations used and the Voland hardness of samples of each formulation as cured and after 7 days in an oven maintained at 100° C. are shown in Table 12. Table 12 shows that the polyurethane gels had decreased in hardness after 7 days at 100° C. by over 75 and 85% respectively but the polyurea gels had decreased in hardness by only 39 and 11% after the same aging.

In a separate experiment, stabilized gels of the invention which were isocyanate rich, on stoichiometry and amine rich but which were otherwise identical were prepared. The gels were exposed to oxygen at 225° C. in a DSC and the time which elapsed before rapid absorption of oxygen was measured to be <14.5, 16.1 and 19.6 minutes respectively. Thus the amine rich gels show much greater oxidative stability than do the other gels.

TABLE 12

| Dimer di-isocyanate (g) | Trifunctional amine or glycol | | Difunctional amine or glycol | | Ditridecyl phthalate (g) | Voland hardness | |
|---|---|---|---|---|---|---|---|
| | Name | (g) | Name | (g) | | As cured (g) | Aged (g) |
| 0.93 | T-5000 | 6.57 | — | — | 17.5 | 115 | 70 |
| 1.05 | T-5000 | 5.16 | D-2000 | 1.29 | 17.5 | 18 | 16 |
| 1.67 | PPG-4000 | 5.85 | — | — | 17.5 | 125 | 30* |
| 1.85 | PPG-4000 | 4.52 | PPG-2000 | 1.11 | 17.5 | 29 | 4* |

Notes to Table 12:
*These are not examples of the invention.

EXAMPLE 9

Kits for preparing polyurea gels were prepared from the ingredients listed in Table 13 (all amount are parts by weight). For each application Parts A and B were placed in disposable cartridges and dispensed through a static mixer/dispenser into an end of a telephone cable or high voltage cable where, for example a splice has been made and cured to form a water block. The gel time for the first formulation was about three minutes and the gel had a hardness of 35 g and a tack of 4 to 5 g with a stress relaxation of 1.5%. The gel time for the second formulation was also about three minutes and the gel had a hardness of 29 g, a tack of 7.5 g and a stress relaxation of 8.5%. The third formulation had a gel time of about 2.5 minutes, a hardness of 28 g, a tack of 25 g and exhibited a stress relaxation of 7.0%. This last formulation is particularly suited for use as a filling in, for example, protective articles such as are disclosed in U.S. Pat. Nos. 4,600,261; 4,634,207; 4,864,725; 4,865,905; 4,610,738 and 4,622,692; and in telephone terminal blocks and wire and cable splice enclosures such as are described in U.S. Pat. Nos. 4,846,721; 4,859,809; and 4,880,676 and in published patent applications EP 0,298,713 and WO 89/08338. The entire disclosures of all of the above patents and patent applications are incorporated by reference herein for all purposes.

TABLE 13

| Application: | Telephone cable gel | High voltage cable gel | For use in sealing caps and covers |
|---|---|---|---|
| Part A | | | |
| Dimer di-isocyanate: | 1.91 | 1.99 | 1.99 |
| Therminol 66: | 27.87 | 27.84 | 27.98 |
| Irganox 1010 : | 0.30 | 0.60 | 0.60 |
| Part B | | | |
| Jeffamine T-5000: | 8.00 | 7.50 | 7.50 |
| Jeffamine D-2000: | 2.00 | 2.50 | 2.50 |
| Therminol 66: | 19.78 | 20.13 | 19.97 |
| Naugard 445*: | 0.30 | — | — |
| Tinuvin 765**: | — | 0.30 | 0.30 |

: tetrakis[methylene 3-(3',5'-ditert-butyl-4'-hydroxyphenyl)propionate]methane
*: 4,4'-bis(α,α-dimethylbenzyl) diphenylamine
**: bis(1,2,2,6,6-pentamethyl-4-piperidinyl) sebacate

EXAMPLE 10

This example shows that soft gels of the invention can be prepared using diluent contents less than 40%. Gels were prepared using the procedure of Example 1. The formulations used and properties of the resultant gels are shown in Table 14. These gels have particularly high tack values.

TABLE 14

| Sample No. | Polymer content % w/w | Isocyanate TXMDI | Amine T5000 | Amine D2000 | Diluent Therminol 60 | Gel Time (sec) | Hardness (g) | Stress Relaxation (%) | Tack (g) |
|---|---|---|---|---|---|---|---|---|---|
| 10-1 | 50 | 2.19 | 11.40 | 11.41 | 25.00 | ~75 | 9/56 | 36 | 50 |
| 10-2 | 60 | 2.62 | 13.69 | 13.69 | 20.00 | 30 | 8/96 | 40 | 120 |
| 10-3 | 70 | 3.06 | 15.96 | 15.96 | 15.00 | 20 | 20/167 | 43 | 135 |

*2 hr cure at room temperature/after 87 hr at 60° C.

EXAMPLE 11

Polyurea gels of the invention were compared with polyurethane gels, not of the invention, to assess their compatibility with plasticized polyvinyl chloride containing about 22% dioctyl phthalate as plasticizer. The formulations (in parts by weight) of the polyurea and polyurethane are given below in Table 15.

Flat PVC sheets 25-30 mils (0.63-0.76 mm) thick were placed between 0.25 in (6.3 mm) thick sheets of the gels and the assemblies maintained at 80° C. for 7 days. The changes in weight and the changes in tensile strength and rupture elongation of the PVC sheet were then measured. The PVC sheet placed in contact with polyurea gel gained weight by 3% while its tensile strength was almost unchanged (increased 1.5%) and its rupture elongation decreased by 20%. The PVC sheet placed in contact with polyurethane gel decreased in weight by 13.6% while its tensile strength increased by 18.8% and its rupture elongation decreased by 46%.

TABLE 15

|  | Polyurea gel | Polyurethane gel* |
|---|---|---|
| Part A |  |  |
| DDI | 1.96 | 7.31 |
| Diluent: |  |  |
| Therminol 66 | 27.94 | — |
| Shellflex 371 | — | 42 |
| Stabilizer | 0.3 | 1.3 |
| Part B |  |  |
| Jeffamine T-5000 | 8.00 | — |
| Jeffamine D2000 | 2.00 | — |
| Polybutadiene | — | 26.96 |
| Therminol 66 | 19.9 | — |
| Shellflex 371 | — | 22.57 |
| Stabilizer | 0.3 | 0.04 |
| n-Octyl-n-decyl trimellitate | — | 50 |

EXAMPLE 12

A polyurea gel was prepared using the procedure of Example 1 from the following ingredients:

| Part A: | Parts by weight | Part B: | Parts by weight |
|---|---|---|---|
| DDI | 2.90 | Sylvamide 125 | 2.00 |
| Therminol 60 | 11.25 | Therminol 60 | 11.25 |
| Ketjenflex 8 | 11.25 | Ketjenflex 8 | 11.25 |

Silvamide 125 is an amide rich polyamide available from Sylvachem Corporation. The gel had a hardness of 34 g, a stress relaxation of 14.5% and a tack of 1 g.

Figure 2:
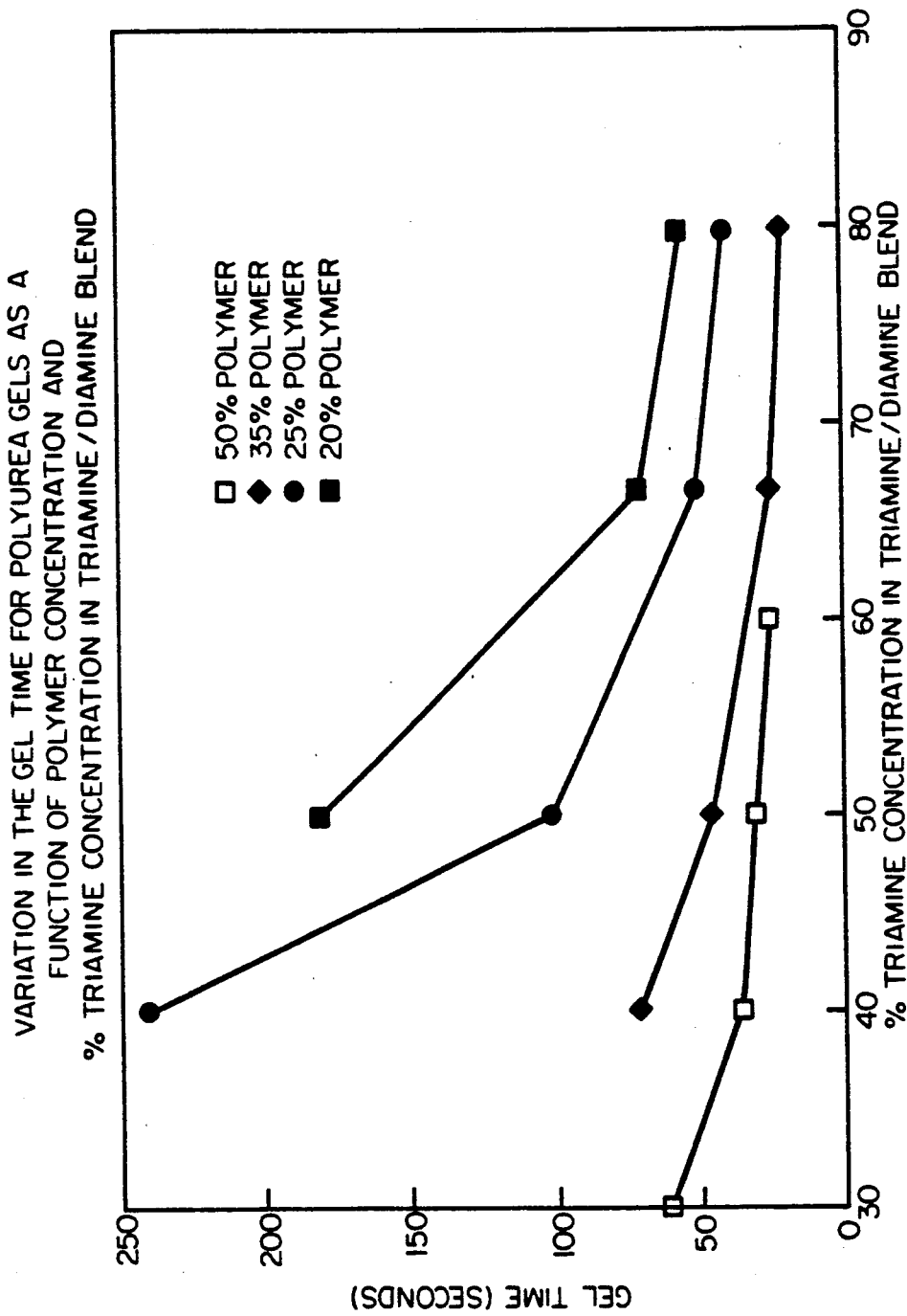
FIG. 2 illustrates how the gel time varies with the polymer concentration
Figure 3:
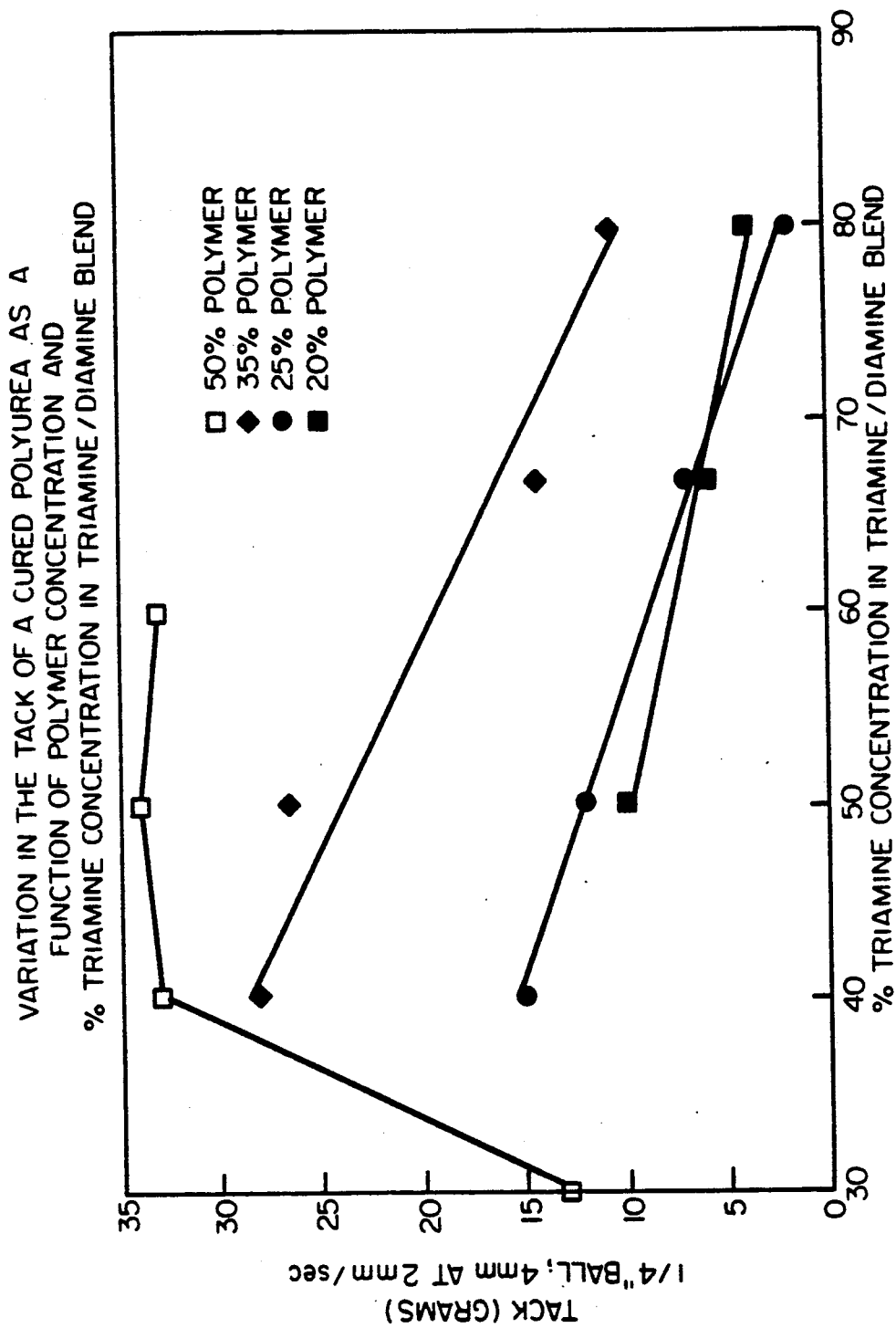
FIG. 3 illustrates how the tack exhibited by cured polyurea gels of one embodiment of the invention varies with the polymer concentration and the crosslink density (triamine content of the triamine/diamine blend).

FIG. 1 illustrates how the hardness of the cured polyurea gels of Example 1 varies with polymer concentration and diluent level. FIG. 2 illustrates how the hardness of these cured gels varies with the ratio of diamine to triamine and FIG. 3 illustrates how the gel time varies with polymer concentration and diamine to triamine ratio.

EXAMPLE 13

This example illustrates the preparation of high-polymer content gels of this invention made from a ketone-blocked amine.

The part (B) (amine) polyurea gel masterbatches containing Jeffamine T-5000, 2-decanone, and Therminol 66 extender fluid were prepared by weighing the materials into plastic beakers. These solutions were mixed, covered with aluminum foil, and placed in a 60° C. oven for 16 hr to allow the ketimine to form. After removal from the oven the solutions were allowed to cool to room temperature for two hours. A part (A) masterbatch (dimer di-isocyanate) was prepared (the same part (A) masterbatch was used for all formulations) by weighting out the components, mixing, and pouring into separate beakers. The part (A)'s were then mixed with the part (B)'s. The mixtures were allowed to stand at room temperature and checked periodically for gelation. Hardness of the gels was measured using a Voland Texture Analyzer with a ¼" ball probe inserted 4 mm at 0.2 mm/sec. The results are provided in Table 16:

TABLE 16

|  | Per Cent Polymer | | | |
|---|---|---|---|---|
|  | 20 | 30 | 45 | 60 |
| Part A |  |  |  |  |
| DDI 1410 | 1.50 | 1.50 | 1.50 | 1.50 |
| Therminol 60 | 4.00 | 4.00 | 4.00 | 4.00 |
| TOTAL WEIGHT | 5.50 | 5.50 | 5.50 | 5.50 |
| Part B |  |  |  |  |
| Jeffamine T-5000 | 10.00 | 10.00 | 10.00 | 10.00 |
| Therminol 66 | 40.90 | 21.73 | 7.96 | 2.57 |
| 2-Decanone | 1.10 | 1.10 | 1.10 | 1.10 |
| TOTAL WEIGHT | 52.00 | 32.83 | 19.06 | 13.67 |
| Gel time (min) | ~60 | ~60 | ~60 | ~60 |
| Hardness (g) |  |  |  |  |
| 6 hr cure time | 41 | 78 | 136 | 243 |
| 24 hr cure time | 69 | 152 | 325 | 589 |
| 7 day cure time | 76 | 175 | 427 | N.D. |

N.D. — not determined

EXAMPLE 14

This example illustrates the blocking of amines with an aldehyde, in gels of this invention.

Part (B) (amine) masterbatches and a part (A) (isocyanate) masterbatch were prepared from Desmodur N-3300, Jeffamine D-4000, dodecyl aldehyde, and Therminol 60 extender fluid generally by the procedure of the immediately previously example. A series of gels containing 20% polymer was prepared and analyzed as before. The results are provided in Table 17:

TABLE 17

|  | Sample Number | | | | | |
|---|---|---|---|---|---|---|
|  | 1 | 2 | 3 | 4 | 5 | 6 |
| Part A |  |  |  |  |  |  |
| Desmodur N-3300 | 1.00 | 1.00 | 1.00 | 1.00 | 1.00 | 1.00 |
| Therminol 60 | 29.56 | 29.56 | 29.56 | 29.56 | 29.56 | 29.56 |
| TOTAL WEIGHT | 30.56 | 30.56 | 30.56 | 30.56 | 30.56 | 30.56 |
| Part B |  |  |  |  |  |  |
| Jeffamine D-4000 | 10.00 | 10.00 | 10.00 | 10.00 | 10.00 | 10.00 |
| Therminol 60 | 20.56 | 20.56 | 20.56 | 20.56 | 20.56 | 20.56 |
| Dodecyl aldehyde | 0.15 | 0.30 | 0.45 | 0.60 | 0.75 | 0.85 |
| TOTAL WEIGHT | 30.71 | 30.86 | 31.01 | 31.16 | 31.31 | 31.41 |
| Gel time (min) | 1 | 6 | 70 | 150 | 300 | 420 |
| Hardness (g) |  |  |  |  |  |  |
| 24 hr cure time | 140 | 102 | 69 | 35 | 16 | 11 |
| 10 day cure time | 158 | 135 | 112 | 87 | 64 | 48 |

We claim;

1. A composition which comprises a crosslinked polyurea and which has a Voland hardness of from 1 to 500 g. and an ultimate elongation of at least 50%.

2. A composition according to claim 1 further comprising a diluent in an amount of from 25% by weight to 95% by weight of the combined weights of the crosslinked polyurea and the diluent.

3. A composition according to claim 1 wherein the average molecular weight between urea groups in the polyurea is less than 250 g per mole of polymer.

4. A composition according to claim 1 wherein the average molecular weight between urea groups in the polyurea is at least 500 g per mole of polymer.

5. A composition according to claim 1 wherein the average molecular weight between crosslinks in the polyurea is at least 2000 g per mole.

6. A composition according to claim 2 wherein the polyurea gel has a gel fraction of 5% by weight to 75% by weight of the combined weights of the polyurea and diluent.

7. A composition according to claim 2 wherein the diluent comprises two diluents of different dielectric constants.

8. A method of making a crosslinked polyurea composition having a Voland hardness of from 1 to 500 g and an ultimate elongation of at least 50%, comprising the step of reacting together
  (1) a first organic compound containing amine groups; and
  (2) an second organic compound containing isocyanate groups or isocyanate precursor groups;
in the presence of a diluent, which is inert to reaction with the first organic compound and inert to reaction with the second organic compound, in an amount of from at least 25% by weight to 95% by weight of the combined weights of the first organic compound, the second organic compound and the diluent.

9. A method according to claim 8, wherein the first organic compound contains an average of n amine groups per molecule where n is at least 2; the second organic compound contains an average of m isocyanate groups or isocyanate precursor groups where m is at least 2; and the sum of n and m is at least 4.1.

10. A method according to claim 8, wherein the first organic compound has the formula $$Q-\{[-A-]_h-D\}_{i-1}-A-Q$$

and the second organic compound has the formula:

$$P-\{[-A-]_j-E\}_{k-1}-A-P$$

where each of h, j, i and k, which may be the same or different, is an integer having a value of at least 1 such that the sum of h, j, i and at least 20 and less than 200;
  each of the Q radicals, which may be the same or different is linked directly to a carbon atom of an A radical and is a primary or secondary amine group;
  each of the P radicals, which may be the same or different is linked directly to a carbon atom of an A radical and is an isocyanate precursor group;
  each of the A radicals, which may be the same or different, has the formula

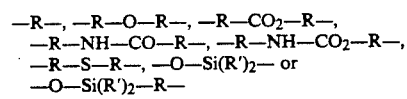

where each of the R radicals, which may be the same or different, is an alkylene, substituted alkylene, alkenylene, substituted alkenylene, arylene or substituted arylene radical, and each of the R' radicals, which may be the same or different is an alkyl, substituted alkyl, aryl or substituted aryl radical;
  each of the D radicals, which may be the same or different is a valence bond or a secondary amine group or an alkylene, substituted alkylene, alkenylene, substituted alkenylene, arylene or substituted arylene radical; and
  each of the E radicals, which may be the same or different, is a valence bond or an alkylene, substituted alkylene, alkenylene, substituted alkenylene, arylene or substituted arylene radical.

11. A method according to claim 8, wherein the first organic compound is an alpha-amino-propyl, omega-amino terminated polypropylene oxide with a molecular weight of from 200 to 20,000; an alpha-amino-ethyl, omega-amino terminated polyethylene oxide with a molecular weight of from 200 to 20,000; an alpha-amino-ethyl, omega-amino terminated polytetramethylene oxide with a molecular weight of from 250 to 25,000; 4,4'-diamino-3,3'-dimethyldicyclohexylmethane; diethyltoluenediamine, 3,5-dimethylthio-2,4-toluenediamine; an aminopropyldimethyl terminated polydimethylsiloxane with a molecular weight of from 2,000 to 30,000; an aminobutyldimethyl terminated polydimethylsiloxanes with a molecular weight of from 2,000 to 30,000; a dimer diamine; an amine rich polyamide resin; an amine terminated amine-epoxy adduct; diaminodiphenyl sulfone; ethylenebisaniline; methylenedianiline; diethyltoluenediamine; 3,5-dimethylthio-2,4-toluenediamine; an amine terminated polybutadiene; an amine terminated butadiene-acrylonitrile copolymer; or a mixture of any two or more of these.

12. A method according to claim 8, wherein the second organic compound is ethylene di-isocyanate; trimethylene di-isocyanate; dodecamethylene di-isocyanate; hexamethylene di-isocyanate; hexamethylene di-isocyanate trimer; tetraethylene di-isocyanate; pentamethylene di-isocyanate; propylene-1,2-diisocyanate; 2,3-dimethyltetramethylene di-isocyanate; 1,4-diisocyanato cyclohexane, ;methyl-hexamethylene di-isocyanate; 3-isocyanatomethyl-3,5,5-trimethylcyclohexyl isocyanate; cyclopentene-1,3-diisocyanate; p-phenylene di-isocyanate; naphthalene di-isocyanate; 4,4'-diphenylene methane di-isocyanate; 4,4'-diphenylene propane di-isocyanate; tetramethylxylylene di-isocyanate; 1,2,3,4-tetraisocyanato butane; butane-1,2,3-trisocyanate; an isocyanate-containing linear and branched aliphatic and aromatic polyether or an isocyanate-containing linear and branched aliphatic and aromatic polyester.

13. A method according to claim 8, wherein the amine groups in the first organic compound have been blocked by imine formation with an aldehyde or ketone.

14. A method according to claim 13, wherein the aldehyde or ketone is selected from the group consisting of acetone, 2-butanone, methyl isobutyl ketone, 2-decanone, 2-undecanone, 3-tridecanone, 3-decanone, 10-nonadecanone, 4-hydroxy-4-methylpentanone, acetophenone, decanal, undecanal, dodecanal, benzaldehyde, and ethoxy-benzaldehyde.

15. A method of protecting a substrate, comprising
  (1) providing a composition comprising a crosslinked polyurea having a Voland hardness of from 1 to 500 g and an ultimate elongation of at least 50%; and
  (2) applying the composition to the substrate.

16. A method according to claim 15, wherein the composition further comprises a diluent in an amount of from 25% by weight to 95% by weight of the combined weights of the crosslinked polyurea and the diluent.

17. A method according to claim 15, wherein the average molecular weight between urea groups in the crosslinked polyurea is less than 250 g per mole of polymer.

18. A method according to claim 15, wherein the average molecular weight between urea groups in the crosslinked polyurea is at least 500 g per mole of polymer.

19. A method according to claim 15, wherein the average molecular weight between crosslinks in the crosslinked polyurea is at least 2000 g per mole.

20. A method according to claim 16, wherein the crosslinked polyurea has a gel fraction of 5% by weight to 75% by weight of the combined weights of the crosslinked polyurea and diluent.

21. A kit comprising at least two containers, each of said containers comprising at least one material selected from the group consisting of:
(1) a first organic compound containing amine groups;
(2) an second organic compound containing isocyanate groups or isocyanate precursor groups; and
(3) a diluent which is inert to reaction with the first organic compound and inert to reaction with the second organic compound, the total amount of the diluent in the containers being from 25% by weight to 95% by weight of the combined weights of the first and second organic compounds and the diluent in the containers;
the division of materials between the containers being such that the first organic compound and the second organic compound are stable when the containers are maintained at room temperature (25° C.) under dry conditions for 6 months;
the contents of the containers when mixed and fully cured providing a crosslinked polyurea gel which has a Voland hardness of from 1 to 500 g. and an ultimate elongation of at least 50%.

22. A kit according to claim 21, wherein the first organic compound contains an average of n amine groups per molecule where n is at least 2; the second organic compound contains an average of m isocyanate groups or isocyanate precursor groups where m is at least 2; and the sum of n and m is at least 4.1.

23. A kit according to claim 21, wherein the first organic compound has the formula

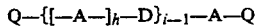

and the second organic compound has the formula:

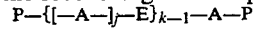

where each of h, j, i and k, which may be the same or different, is an integer having a value of at least 1 such that the sum of h, j, i and k, is at least 20 and less than 200;
each of the Q radicals, which may be the same or different is linked directly to a carbon atom of an A radical and is a primary or secondary amine group;
each of the P radicals, which may be the same or different is linked directly to a carbon atom of an A radical and is an isocyanate or isocyanate precursor group;
each of the A radicals, which may be the same or different, has the formula

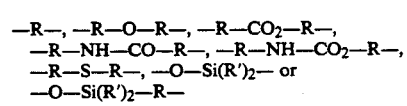

where each of the R radicals, which may be the same or different, is an alkylene, substituted alkylene, alkenylene, substituted alkenylene, arylene or substituted arylene radical, and each of the R' radicals, which may be the same or different is an alkyl, substituted alkyl, aryl or substituted aryl radical;

each of the D radicals, which may be the same or different is a valence bond or a secondary amine group or an alkylene, substituted alkylene, alkenylene, substituted alkenylene, arylene or substituted arylene radical; and each of the E radicals, which may be the same or different, is a valence bond or an alkylene, substituted alkylene, alkenylene, substituted alkenylene, arylene or substituted arylene radical.

24. A kit according to claim 21, wherein the first organic compound is an alpha-amino-propyl, omega-amino terminated polypropylene oxide with a molecular weight of from 200 to 20,000; an alpha-amino-ethyl, omega-amino terminated polyethylene oxide with a molecular weight of from 200 to 20,000; an alpha-amino-ethyl, omega-amino terminated polytetramethylene oxide with a molecular weight of from 250 to 25,000; 4,4'-diamino-3,3'-dimethyldicyclohexylmethane; diethyltoluenediamine, 3,5-dimethylthio-2,4-toluenediamine; an aminopropyldimethyl terminated polydimethylsiloxane with a molecular weight of from 2,000 to 30,000; an aminobutyldimethyl terminated polydimethylsiloxanes with a molecular weight of from 2,000 to 30,000; a dimer diamine; an amine rich polyamide resin; and amine terminated amine-epoxy adduct; diaminodiphenyl sulfone; ethylenebisaniline; methylenedianiline; diethyltoluenediamine; 3,5-dimethylthio-2,4-toluenediamine; an amine terminated polybutadiene; an amine terminated butadiene-acrylonitrile copolymer; or a mixture of any two or more of these.

25. A kit according to claim 21, wherein the second organic compound ethylene di-isocyanate; trimethylene di-isocyanate; dodecamethylene di-isocyanate; hexamethylene di-isocyanate; hexamethylene di-isocyanate trimer; tetraethylene di-isocyanate; pentamethylene di-isocyanate; propylene-1,2-diisocyanate; 2,3-dimethyltetramethylene di-isocyanate; 1,4-diisocyanato cyclohexane, ;methyl-hexamethylene di-isocyanate; 3-isocyanatomethyl-3,5,5-trimethylcyclohexyl isocyanate; cyclopentene-1,3diisocyanate; p-phenylene di-isocyanate; naphthalene di-isocyanate; 4,4'-diphenylene methane di-isocyanate; 4,4'-diphenylene propane di-isocyanate; tetramethylxylylene di-isocyanate; 1,2,3,4-tetraisocyanato butane; butane-1,2,3-triisocyanate; an isocyanate-containing linear and branched aliphatic and aromatic polyether or an isocyanate-containing linear and branched aliphatic and aromatic polyester.

26. A kit according to claim 21, wherein the amine groups in the first organic compound have been blocked by imine formation with an aldehyde or ketone.

27. A kit according to claim 26, wherein the aldehyde or ketone is selected from the group consisting of acetone, 2-butanone, methyl isobutyl ketone, 2-decanone, 2-undecanone, 3-tridecanone, 3-decanone, 10-nonadecanone, 4-hydroxy-4-methylpentanone, acetophenone, decanal, undecanal, dodecanal, benzaldehyde, and ethoxy-benzaldehyde.

28. A crosslinkable composition which when fully cured has a Voland hardness of from 1 to 500 g and an ultimate elongation of at least 50% and which comprises a first organic compound containing amine groups, a second organic compound containing isocyanate or isocyanate precursor groups, and a diluent in an amount from 25% by weight to 95% by weight of the combined weights of the first organic compound, the second organic compound and the diluent.

29. A crosslinkable composition according to claim 28, wherein the first organic compound contains an average of n amine groups per molecule and the second organic compound contains an average of m isocyanate or isocyanate precursor groups per molecule, where each of n and m is at least 2, and the sum of n and m is at least 4.1, the composition having a gel time less than 600 seconds at 25° C.

30. A composition according to claim 28, wherein the first organic compound has the formula Q—{[—A—]$_h$—D}$_{i-1}$—A—Q and the second organic compound has the formula:

P—{[—A—]$_j$—E}$_{k-1}$—A—P where each of h, j, i and k which may be the same or different, is an integer having a value of at least 1 such that the sum of h, j, i and k is at least 20 and less than 200;

each of the Q radicals, which may be the same or different is linked directly to a carbon atom of an A radical and is a primary or secondary amine group;

each of the P radicals, which may be the same or different is linked directly to a carbon atom of an A radical and is an isocyanate or isocyanate precursor group;

each of the A radicals, which may be the same or different, has the formula

—R—, —R—O—R—, —R—CO$_2$—R—,
—R—NH—CO—R—, —R—NH—CO$_2$—R—,
—R—S—R—, —O—Si(R')$_2$—or
—O—Si(R')$_2$—R— where each of the R radicals, which may be the same or different, is an alkylene, substituted alkylene, alkenylene, substituted alkenylene, arylene or substituted arylene radical, and each of the R' radicals, which may be the same or different, is a alkyl, substituted alkyl, aryl or substituted aryl radical;

each of the D radicals, which may be the same or different, is a valence bond or a secondary amine group or an alkylene, substituted alkylene, alkenylene, substituted alkenylene, arylene or substituted arylene radical; and each of the E radicals, which may be the same or different, is a valence bond or an alkylene, substituted alkylene, alkenylene, substituted alkenylene, arylene or substituted arylene radical.

31. A crosslinkable composition according to claim 28, wherein the amine groups in the first organic compound have been blocked by imine formation with an aldehyde or ketone.

32. A crosslinkable composition according to claim 31, wherein the aldehyde or ketone is selected from the group consisting of acetone, 2-butanone, methyl isobutyl ketone, 2-decanone, 2-undecanone, 3-tridecanone, 3-decanone, 10-nonadecanone, 4-hydroxy-4-methylpentanone, acetophenone, decanal, undecanal, dodecanal, benzaldehyde, and ethoxy-benzaldehyde.

33. A method of protecting a substrate, which comprises placing on the substrate a mixture comprising:

(1) a first organic compound containing amine groups;

(2) an second organic compound containing isocyanate groups or isocyanate precursor groups; and (3) a diluent, which is inert to reaction with the first organic compound and with the second organic compound, in an amount of from at least 25% by weight to 95% by weight; and curing the mixture.

34. A method according to claim 33, wherein the first organic compound contains an average of n amine groups per molecule where n is at least 2; the second organic compound contains an average of m isocyanate groups or isocyanate precursor groups where m is at least 2; and the sum of n and m is at least 4.1.

35. A method according to claim 33, wherein the first organic compound has the formula Q—{[—A—]$_h$—D}$_{i-1}$—A—Q and the second organic compound has the formula:

P—{[—A—]$_j$—E}$_{k-1}$—A—P where each of h, j, i and k, which may be the same or different, is an integer having a value of at least 1 such that the sum of h, j, i and k is at least 20 and less than 200;

each of the Q radicals, which may be the same or different is linked directly to a carbon atom of an A radical and is a primary or secondary amine group;

each of the P radicals, which may be the same or different is linked directly to a carbon atom of an A radical and is an isocyanate or isocyanate precursor group;

each of the A radicals, which may be the same or different, has the formula

—R—, —R—O—R—, —R—CO$_2$—R—,
—R—NH—CO—R—, —R—NH—CO$_2$—R—,
—R—S—R—, —O—Si(R')$_2$—or
—O—Si(R')$_2$—R— where each of the R radicals, which may be the same or different, is an alkylene, substituted alkylene, alkenylene, substituted alkenylene, arylene or substituted arylene radical, and each of the R' radicals, which may be the same or different is an alkyl, substituted alkyl, aryl or substituted aryl radical;

each of the D radicals, which may be the same or different is a valence bond or a secondary amine group or an alkylene, substituted alkylene, alkenylene, substituted alkenylene, arylene or substituted arylene radical; and each of the E radicals, which may be the same or different, is a valence bond or an alkylene, substituted alkylene, alkenylene, substituted alkenylene, arylene or substituted arylene radical.

36. A method according to claim 33, wherein the first organic compound is an alpha-amino-propyl, omega-amino terminated polypropylene oxide with a molecular weight of from 200 to 20,000; an alpha-amino-ethyl, omega-amino terminated polyethylene oxide with a molecular weight of from 200 to 20,000; an alpha-amino-ethyl, omega-amino terminated polytetramethylene oxide with a molecular weight of from 250 to 25,000; 4,4'-diamino-3,3'-dimethyldicyclohexylmethane; diethyltoluenediamine, 3,5-dimethylthio-2,4-toluenediamine; an aminopropyldimethyl terminated polydimethylsiloxane with a molecular weight of from 2,000 to 30,000; an aminobutyldimethyl terminated polydimethylsiloxanes with a molecular weight of from 2,000 to 30,000; a dimer diamine; an amine rich polyamide resin; an amine terminated amine-epoxy adduct; diaminodiphenyl sulfone; ethylenebisaniline; methylenedianiline; diethyltoluenediamine; 3,5-dimethylthio-2,4-toluene-diamine; an amine terminated polybutadiene; an amine terminated butadiene-acrylonitrile copolymer; or a mixture of any two or more of these.

37. A method according to claim 33, wherein the second organic compound is ethylene di-isocyanate; trimethylene di-isocyanate; dodecamethylene di-isocyanate; hexamethylene di-isocyanate; hexamethylene di-isocyanate trimer; tetraethylene di-isocyanate; pentamethylene di-isocyanate; propylene-1,2-diisocyanate; 2,3-dimethyltetramethylene di-isocyanate; 1,4-diisocyanato cyclohexane, ;methyl-hexamethylene di-isocyanate; 3-isocyanatomethyl-3,5,5-trimethylcyclohexyl isocyanate; cyclopentene-1,3-diisocyanate; p-phenylene di-isocyanate; naphthalene di-isocyanate; 4,4'-diphenylene methane di-isocyanate; 4,4'-diphenylene propane di-isocyanate; tetramethylxylylene di-isocyanate; 1,2,3,4-tetraisocyanato butane; butane-1,2,3-triisocyanate; an isocyanate-containing linear and branched aliphatic and aromatic polyether or an isocyanate-containing linear and branched aliphatic and aromatic polyester.

38. A method according to claim 33, wherein the amine group s in the first organic compound have been blocked by imine formation with an aldehyde or ketone.

39. A method according to claim 38, wherein the aldehyde or ketone is selected from the group consisting of acetone, 2-butanone, methyl isobutyl ketone, 2-decanone, 2-undecanone, 3-tridecanone, 3-decanone, 10-nonadecanone, 4-hydroxy-4-methylpentanone, acetophenone, decanal, undecanal, dodecanal, benzaldehyde, and ethoxy-benzaldehyde.

40. A method for preparing a composition of predetermined dielectric constant, comprising:
(A) selecting a blend of diluents each of which exhibits a dielectric constant different from any other of the diluents selected, the weight ratios of the diluents being chosen such that the blend has a desired dielectric constant; and
(B) incorporating said blend into a composition comprising a crosslinked polyurea gel in an amount such that the composition exhibits the desired dielectric constant.

* * * * *